United States Patent
Millius et al.

(10) Patent No.: US 12,283,816 B2
(45) Date of Patent: Apr. 22, 2025

(54) HYDRO-POWER GENERATION FOR IRRIGATION CONTROL

(71) Applicant: Rain Bird Corporation, Azusa, CA (US)

(72) Inventors: Michael J. Millius, Vail, AZ (US); Leo M. Pedlow, Jr., Vail, AZ (US); Riccardo J. Tresso, Oro Valley, AZ (US); Steven D. Geerligs, Tucson, AZ (US)

(73) Assignee: Rain Bird Corporation, Azusa, CA (US)

( * ) Notice: Subject to any disclaimer, the term of this patent is extended or adjusted under 35 U.S.C. 154(b) by 0 days.

(21) Appl. No.: 18/408,450

(22) Filed: Jan. 9, 2024

(65) Prior Publication Data

US 2024/0235193 A1 Jul. 11, 2024

Related U.S. Application Data

(60) Provisional application No. 63/437,992, filed on Jan. 9, 2023.

(51) Int. Cl.
*H02J 3/00* (2006.01)
*A01G 25/16* (2006.01)
(Continued)

(52) U.S. Cl.
CPC .............. *H02J 3/007* (2020.01); *F03B 13/08* (2013.01); *H02J 3/32* (2013.01); *H02J 7/1415* (2013.01);
(Continued)

(58) Field of Classification Search
CPC . H02J 3/007; H02J 3/32; H02J 7/1415; F03B 13/08; F03B 13/00; H02K 7/1823; A01G 25/16
(Continued)

(56) References Cited

U.S. PATENT DOCUMENTS

| | | | |
|---|---|---|---|
| 4,838,310 | A | 6/1989 | Scott |
| 5,333,785 | A | 8/1994 | Dodds |

(Continued)

FOREIGN PATENT DOCUMENTS

| | | |
|---|---|---|
| EP | 4337855 | 3/2024 |
| NL | 2021361 B1 | 1/2020 |

(Continued)

OTHER PUBLICATIONS

PCT; App. No. PCT/US2024/010928; International Search Report and Written Opinion mailed Jun. 28, 2024; (18 pages).

(Continued)

*Primary Examiner* — Charles Reid, Jr.
(74) *Attorney, Agent, or Firm* — Fitch, Even, Tabin & Flannery LLP

(57) ABSTRACT

Some embodiments provide hydro-power generation systems for irrigation systems. In some embodiments, a system comprises a generator comprising a turbine at least partially inserted into a fluid flow path of a conduit of the irrigation system and to be activated by a fluid flow in the conduit, wherein the generator is to output an electrical power signal; a control circuit to: determine a characteristic of the electrical power signal; determine, based on the characteristic, a load impedance selected from a plurality of load impedances; and output a control signal to select the load impedance. The system also comprises a variable load circuit to: receive the control signal; and provide the load impedance, where an impedance of the variable load circuit is based on the characteristic to provide power generation over various flow rates of fluid in the fluid flow path.

21 Claims, 26 Drawing Sheets

(51) Int. Cl.
*F03B 13/08* (2006.01)
*H02J 3/32* (2006.01)
*H02J 7/14* (2006.01)
*H02K 7/18* (2006.01)

(52) U.S. Cl.
CPC .......... *H02K 7/1823* (2013.01); *A01G 25/16* (2013.01); *F05B 2220/706* (2013.01)

(58) Field of Classification Search
USPC ....................................... 290/43, 54; 322/75
See application file for complete search history.

(56) References Cited

U.S. PATENT DOCUMENTS

| | | |
|---|---|---|
| 5,427,350 A | 6/1995 | Rinkewich |
| 5,661,349 A | 8/1997 | Luck |
| 5,695,122 A | 12/1997 | Messinger |
| 6,283,139 B1 | 9/2001 | Symonds |
| 6,312,191 B1 | 11/2001 | Rosenfeld |
| 6,661,112 B2 | 12/2003 | Zeier |
| 6,731,019 B2 * | 5/2004 | Burns ................ F03B 13/148 290/43 |
| 6,864,591 B2 | 3/2005 | DeFrank |
| 6,885,114 B2 | 4/2005 | Baarman |
| 6,927,501 B2 | 8/2005 | Baarman |
| 7,010,394 B1 | 3/2006 | Runge |
| 7,090,146 B1 | 8/2006 | Ericksen |
| 7,097,113 B2 | 8/2006 | Ivans |
| 7,140,563 B2 | 11/2006 | Sinden |
| 7,182,272 B1 | 2/2007 | Marian |
| 7,191,955 B2 | 3/2007 | Ivans |
| 7,228,726 B2 | 6/2007 | Kates |
| 7,264,177 B2 | 9/2007 | Buck |
| 7,266,428 B2 | 9/2007 | Alexanian |
| 7,348,685 B2 | 3/2008 | Yi |
| 7,349,763 B2 | 3/2008 | Ivans |
| 7,359,769 B2 | 4/2008 | Bailey |
| 7,362,000 B1 | 4/2008 | DeFrank |
| 7,363,113 B2 | 4/2008 | Runge |
| 7,383,721 B2 | 6/2008 | Parsons |
| 7,456,514 B2 | 11/2008 | Ahmad |
| 7,457,687 B1 | 11/2008 | Porter |
| 7,458,521 B2 | 12/2008 | Ivans |
| 7,605,485 B2 | 10/2009 | Pitchford |
| 7,617,992 B2 | 11/2009 | Ivans |
| 7,663,259 B2 | 2/2010 | Baarman |
| 7,685,973 B2 | 3/2010 | Nelson |
| 7,701,076 B2 | 4/2010 | Baarman |
| 7,708,206 B2 | 5/2010 | Ivans |
| 7,723,860 B2 | 5/2010 | Nagler |
| 7,768,147 B2 | 8/2010 | Baarman |
| 7,779,852 B2 | 8/2010 | Burlage |
| 7,812,470 B2 | 10/2010 | Baarman |
| 7,822,511 B2 | 10/2010 | Ivans |
| 7,844,368 B2 | 11/2010 | Alexanian |
| 7,898,102 B2 | 3/2011 | Alstot |
| 7,932,618 B2 | 4/2011 | Baarman |
| 7,945,973 B2 | 5/2011 | Khorshid |
| 7,956,481 B2 | 6/2011 | Baarman |
| 7,962,244 B2 | 6/2011 | Alexanian |
| 7,962,245 B2 | 6/2011 | Runge |
| 8,024,075 B2 | 9/2011 | Fekete |
| 8,055,389 B2 | 11/2011 | Holindrake |
| 8,067,850 B2 | 11/2011 | Alvarez |
| 8,080,913 B2 | 12/2011 | Fielder |
| 8,092,675 B2 | 1/2012 | Kennedy |
| 8,186,609 B2 | 5/2012 | Rapp |
| 8,225,810 B2 | 7/2012 | Blanchard |
| 8,278,775 B2 | 10/2012 | Liao |
| 8,294,292 B2 | 10/2012 | Irwin |
| 8,426,992 B2 | 4/2013 | Baarman |
| 8,443,822 B2 | 5/2013 | Ivans |
| 8,457,798 B2 | 6/2013 | Hackett |
| 8,457,799 B2 | 6/2013 | Cox |
| 8,538,592 B2 | 9/2013 | Alexanian |
| 8,546,965 B2 | 10/2013 | Alvarez |
| 8,616,830 B2 | 12/2013 | Unno |
| 8,678,706 B2 | 3/2014 | Luciano, Jr. |
| 8,698,333 B2 | 4/2014 | Glasser |
| 8,733,155 B2 | 5/2014 | Hill |
| 8,786,122 B2 | 7/2014 | Rajadhyaksha |
| 8,874,275 B2 | 10/2014 | Alexanian |
| 8,919,036 B2 | 12/2014 | Luciano, Jr. |
| 8,928,168 B2 | 1/2015 | Letang |
| 8,946,921 B2 | 2/2015 | Kaiser |
| 9,043,036 B2 | 5/2015 | Fekete |
| 9,049,821 B1 | 6/2015 | Hanna |
| 9,057,353 B2 | 6/2015 | Aubuchon, Sr. |
| 9,089,861 B2 | 7/2015 | Orubor |
| 9,097,234 B2 | 8/2015 | Breau |
| 9,144,203 B2 | 9/2015 | Nelson |
| 9,332,696 B2 | 5/2016 | Salsberg |
| 9,356,226 B2 | 5/2016 | Pargas |
| 9,439,369 B2 | 9/2016 | Christiansen |
| 9,453,492 B2 | 9/2016 | Letang |
| 9,506,448 B2 | 11/2016 | Doronin |
| 9,527,102 B2 | 12/2016 | Hill |
| 9,574,923 B2 | 2/2017 | Williamson |
| 9,651,400 B2 | 5/2017 | Pitchford |
| 9,684,312 B1 | 6/2017 | Eyring |
| 9,759,394 B2 | 9/2017 | Aubuchon |
| 9,901,041 B2 | 2/2018 | Manghi |
| 9,901,046 B2 | 2/2018 | Sun |
| 9,952,568 B2 | 4/2018 | Livadaras |
| 10,088,849 B2 | 10/2018 | Hurst |
| 10,094,355 B2 | 10/2018 | Kanemoto |
| 10,123,493 B2 | 11/2018 | Runge |
| 10,124,358 B1 | 11/2018 | Graham |
| 10,139,259 B2 | 11/2018 | Chen |
| 10,143,147 B2 | 12/2018 | Messner |
| 10,254,728 B2 | 4/2019 | Hill |
| 10,261,523 B2 | 4/2019 | Khabbaz |
| 10,368,504 B2 | 8/2019 | Sabadin |
| 10,512,227 B2 | 12/2019 | Rainone |
| 10,534,378 B1 | 1/2020 | Eyring |
| 10,576,481 B2 | 3/2020 | Patrick |
| 10,721,857 B2 | 7/2020 | Tippery |
| 10,753,337 B2 | 8/2020 | Defrank |
| 10,782,163 B2 | 9/2020 | Vromans |
| 10,815,958 B2 | 10/2020 | Kah, III |
| 10,837,575 B2 | 11/2020 | Heaney |
| 10,925,222 B2 | 2/2021 | Sarver |
| 10,965,109 B2 | 3/2021 | Paul |
| 10,973,182 B1 | 4/2021 | Bangerter |
| 11,047,502 B2 | 6/2021 | Heaney |
| 11,118,556 B2 | 9/2021 | Kah, III |
| 11,152,795 B2 | 10/2021 | Hallstrom |
| 11,152,839 B2 | 10/2021 | Sturman |
| 11,675,375 B2 | 6/2023 | Klein |
| 11,990,823 B2 | 5/2024 | Millius |
| 2002/0021008 A1 | 2/2002 | Hurley |
| 2007/0035134 A1 | 2/2007 | Bristow, Jr. |
| 2007/0074767 A1 | 4/2007 | Roffey |
| 2007/0221750 A1 | 9/2007 | Roberts |
| 2008/0246282 A1 | 10/2008 | Hathaway |
| 2008/0251602 A1 | 10/2008 | Leggett |
| 2009/0001193 A1 | 1/2009 | Parsons |
| 2009/0102193 A1 | 4/2009 | Murphy |
| 2009/0110485 A1 * | 4/2009 | Cripps ................ E02B 9/00 405/75 |
| 2010/0262308 A1 | 10/2010 | Anderson |
| 2010/0270803 A1 | 10/2010 | Irwin |
| 2010/0314880 A1 * | 12/2010 | Cripps ................ E02B 9/04 405/75 |
| 2010/0324744 A1 | 12/2010 | Cox |
| 2010/0329652 A1 | 12/2010 | Gregg |
| 2011/0087379 A1 | 4/2011 | Savelle, Jr. |
| 2011/0111700 A1 | 5/2011 | Hackett |
| 2011/0133467 A1 | 6/2011 | Stiles |
| 2011/0233935 A1 | 9/2011 | Baarman |
| 2011/0309274 A1 | 12/2011 | Parsons |
| 2012/0160350 A1 | 6/2012 | Crugnale |
| 2012/0326443 A1 | 12/2012 | Vince |

(56) References Cited

U.S. PATENT DOCUMENTS

| | | |
|---|---|---|
| 2013/0008542 A1 | 1/2013 | Irwin |
| 2013/0048746 A1 | 2/2013 | Littrell |
| 2013/0113220 A1 | 5/2013 | Staples |
| 2014/0265328 A1* | 9/2014 | Van Blerk ............ F03B 11/004 290/43 |
| 2014/0284932 A1 | 9/2014 | Sharkh |
| 2015/0053786 A1 | 2/2015 | Rosa |
| 2015/0192030 A1 | 7/2015 | Rubinshtein |
| 2015/0252793 A1 | 9/2015 | Croker |
| 2016/0083937 A1 | 3/2016 | Cavarec |
| 2017/0172078 A1 | 6/2017 | Gonzalez Hernandez |
| 2017/0318761 A1 | 11/2017 | Rainone |
| 2017/0347543 A1 | 12/2017 | Khabbaz |
| 2017/0367277 A1 | 12/2017 | Mohindra |
| 2018/0042188 A1 | 2/2018 | Khabbaz |
| 2018/0274212 A1 | 9/2018 | Kuchly |
| 2019/0235456 A1 | 8/2019 | Hill |
| 2019/0297798 A1 | 10/2019 | Levine |
| 2020/0015438 A1 | 1/2020 | Klicpera |
| 2020/0080875 A1* | 3/2020 | Hallstrom ............ G01M 3/2807 |
| 2020/0091737 A1 | 3/2020 | Hallstrom |
| 2020/0124021 A1* | 4/2020 | Reil .................... F03B 3/06 |
| 2020/0208389 A1 | 7/2020 | Chen |
| 2020/0245574 A1 | 8/2020 | Woytowitz |
| 2020/0281137 A1 | 9/2020 | Heaney |
| 2020/0288654 A1 | 9/2020 | Mohr |
| 2020/0344962 A1 | 11/2020 | Wright |
| 2020/0350778 A1 | 11/2020 | Nemecek |
| 2020/0359580 A1 | 11/2020 | Montgomery |
| 2020/0378353 A1 | 12/2020 | Kah, III |
| 2021/0013776 A1 | 1/2021 | Sturman |
| 2022/0018326 A1 | 1/2022 | Cheron |
| 2022/0023894 A1 | 1/2022 | Wright, III |
| 2022/0368195 A1 | 11/2022 | Millius |
| 2022/0395845 A1 | 12/2022 | Bell |
| 2023/0195069 A9 | 6/2023 | Hickenlooper |
| 2024/0053719 A1 | 2/2024 | Hickenlooper |
| 2024/0283325 A1 | 8/2024 | Millius |

FOREIGN PATENT DOCUMENTS

| | | |
|---|---|---|
| WO | 2008066670 | 6/2008 |
| WO | 2016190732 A1 | 12/2016 |
| WO | 2017111591 | 6/2017 |
| WO | 2021141491 A1 | 7/2021 |
| WO | 2022241231 | 11/2022 |
| WO | 2022241237 | 11/2022 |
| WO | 202410928 | 1/2024 |
| WO | 2024151665 | 7/2024 |

OTHER PUBLICATIONS

Amre Supply; "Toto EcoPower Flushometer (Pre-2013) | Generator | Repair and Replace"; https://www.youtube.com/watch?v=WTRbXzwu0VE; Sep. 21, 2017; pp. 1-13.

Kinetron; "Turbine Generator Systems"; https://www.kinetron.eu/turbines; May 12, 2022; 8 pages.

Kinetron; "Turbine System Technology"; https://www.kinetron.eu/technology/turbines; Jun. 21, 2021; 6 pages.

Landscape Business; "John Deere Green Tech Wins IA New Product Award"; Landscape Business; https://landscape-business.com/john-deere-green-tech-wins-ia-new-product-award/; Jan. 9, 2009; 2 pages.

Rain; "The one and only intelligent irrigation"; < https://www.rain.it/en/rain-products/rain-vision-en/>; Mar. 5, 2021; 2 pages; retrieved from Internet Archive Wayback Machine <https://web.archive.org/web/20210305075203/https://www.rain.it/en/rain-products/rain-vision-en/> on Mar. 2, 2023.

Rain; "Turbina Vision"; <https://www.rain.it/en/rain-product/onda-vision/>; available at least as early as Feb. 3, 2023; 6 pages.

Rain; "Turbina Vision"; <https://www.rain.it/wp-content/uploads/wpallimport/files/pdf/superato/2021_TURBINA_instructions.pdf>; 2021; Edition v. 1.0; Rain; Italy; pp. 1-20.

Toto; "EcoPower® Toilet Flush Valve"; https://www.transparencycatalog.com/assets/uploads/pdf/TOTO-Toilet-FlushValve-TET1LA_EPD.pdf; Sep. 2, 2016; 4 pages.

Toto; "Standard EcoPower® Faucet with Mixing Valve"; https://www.transparencycatalog.com/assets/uploads/pdf/TOTO-Standard-Faucet-with-MixingValve-TEL105_EPD.pdf; Sep. 2, 2016; 4 pages.

Toto; "Toto EcoPower"; https://www.youtube.com/watch?v=0P7P0tOyX9c; Nov. 23, 2010; pp. 1-7.

USPTO; U.S. Appl. No. 17/744,349; Notice of Allowance and Fees Due (PTOL-85) mailed Jan. 17, 2024; (pp. 1-13).

\* cited by examiner

HYDRO-POWER GENERATION FOR IRRIGATION CONTROL

CROSS-REFERENCE TO RELATED APPLICATIONS

This application claims the benefit of U.S. Provisional Application No. 63/437,992, filed Jan. 9, 2023, which is incorporated herein by reference in its entirety.

TECHNICAL FIELD

These inventions relate to irrigation control, and more specifically to power generation in an irrigation system.

BACKGROUND

Many types of irrigation systems enable automated irrigation of plant life. With some plant life and/or in some geographic regions, irrigating can be costly. Similarly, with some locations, the installation and maintenance of an irrigation system can be costly at least since many irrigation devices in various locations in the field require power to operate.

BRIEF DESCRIPTION OF THE DRAWINGS

Disclosed herein are embodiments of systems, apparatuses and methods pertaining to power generation in an irrigation system. This description includes drawings, wherein.

Figure 1:
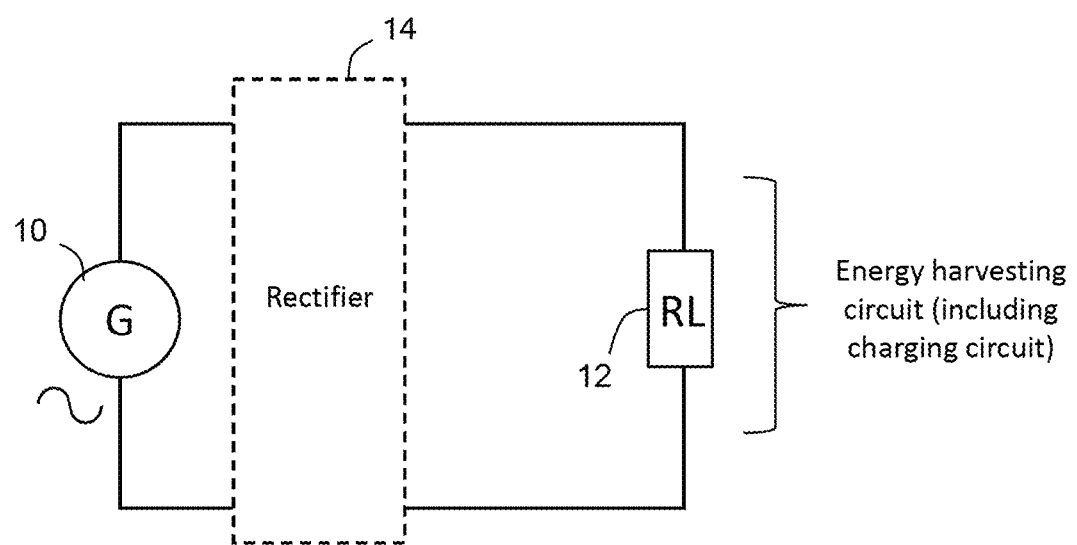
FIG. 1 illustrates a nominal load having a nominal load impedance applied across a hydro-power generator to help provide suitable power generation across multiple fluid flow rates in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. The scope of the invention should be determined with reference to the claims. Reference throughout this specification to "one embodiment," "an embodiment," "some embodiments", "an implementation", "some implementations", "some applications", or similar language means that a particular feature, structure, or characteristic described in connection with the embodiment is included in at least one embodiment of the present invention. Thus, appearances of the phrases "in one embodiment," "in an embodiment," "in some embodiments", "in some implementations", and similar language throughout this specification may, but do not necessarily, all refer to the same embodiment.

Embodiments described herein relate to hydro-power generators and various features to improve performance and promote longevity in performance. Further details of various hydro-power generators can be found in the following patent documents, all of which are incorporated herein by reference in their entirety: (1) U.S. Provisional Application No. 63/189,003, entitled SELF-POWERED IRRIGATION SYSTEMS AND METHODS OF CONTROLLING IRRIGATION, filed May 14, 2021; (2) U.S. Provisional Application No. 63/218,771, entitled SELF-POWERED IRRIGATION SYSTEMS AND METHODS OF CONTROLLING IRRIGATION, filed Jul. 6, 2021; (3) U.S. Non-Provisional application Ser. No. 17/744,349, entitled SELF-POWERED IRRIGATION SYSTEMS, GENERATOR SYSTEMS AND METHODS OF CONTROLLING IRRIGATION, filed May 13, 2022; and U.S. Pat. No. 8,294,292, entitled POWER SUPPLY SYSTEM, issued Oct. 23, 2012.

Power Generation

Referring to FIGS. 1-5, several embodiments are described that relate to improving power generation by a hydro-power generator to improve power generation performance across multiple fluid flow rates.

A typical hydro-power generator 10 includes a turbine (such as an impeller) at least partially inserted into the water flow path, e.g., into a conduit of an irrigation system. It is understood that water can be more generically expressed as a fluid. The impeller is typically rotationally coupled to a motor or electronics of the generator. In some cases, magnets are rotated about a coil to generate alternating current (AC) power which can be stored or used to charge a power storage device such as a battery and/or capacitor. In some embodiments, a rectifier circuit 14 is used to convert the signal to a direct current (DC) electrical signal. In an irrigation control application, there may be remote devices that need power but for which it is inconvenient or costly to provide power. It can be beneficial to include self-powered devices that use power derived from water flowing in the system.

Power generation output from a water turbine such as an impeller of a hydro-power generator 10 is related to the applied load. In some cases, when the turbine speed is high, the applied load can be high as well. When the turbine speed is low, the applied load needs to be significantly lower. One option to provide performance across multiple flow rates is to select a nominal load that is applied across the generator which is a compromise. The nominal load is selected to cover the middle range of the intended flow rates. For example, such an approach is shown in FIG. 1. The generator (G) 10 represents the generator coupled to the turbine and which outputs an electrical power signal such as an alternating current (AC) waveform. A nominal load 12 shown as having a load impedance RL is placed in series with the generator (G) 10, the load 12 representing all circuitry coupled to the generator 10 including the energy harvesting circuit (which can include a battery/capacity charging circuit), and the load impedance RL being the sum of the impedance of the load 12. In some embodiments, the load impedance RL is selected to provide adequate power generation for a range of flow rates. For example, in a given irrigation water flow application, a value of about 200 ohms is selected for RL and this provides adequate power generation when the flow rate is between about 3000-7000 rpm (revolutions per minute) (of the turbine). In some embodiments, such a load can lead to poor performance at low and high speeds. A disadvantage of fixed loading is that power generation may suffer on each end. At very slow flow speeds, the generator 10 may provide no output or the output could be erratic as the turbine changes speed (slowing, stopping, starting, stopping, etc.). In a typical irrigation application, flow rates less than 3000 rpm can be considered low. Furthermore, at very high speed, the compromised loading would not produce as much power as it could if a load more appropriate to a high speed is chosen. In a typical irrigation application, flow rates greater than 7000 rpm can be considered very high. It is understood that nominal and high flow rates may be different ranges in different irrigation applications.

While turbine rotation can be proportional to fluid flow in medium to high flow conditions, lower flows can cause the turbine to temporarily stall or stop as the result magnet poles at specific locations in the generator. When the poles of a permanent magnet motor/generator are aligned with the frame poles, this reduced distance will increase magnetic resistance to rotation. This can easily be observed when rotating any permanent magnet motor or generator. The required torque to turn the shaft is not consistent and rises and falls as the magnets are aligned to the frame poles and then in between them, respectively. The peaks of this rotation torque also increase when the output of the generator is loaded (or shorted). The relationship of rotational torque due electrical shorting is closely related to the rotational speed of the generator turbine.

While the water turbine can produce electrical power from low to high RPM, in practice, the issues discussed above can make power generation impractical at lower RPMs. As an example, a tested generator produced constant power at 1 GPM (gallons per minute), but produced inconsistent power at lower flow rates (0.5 GPM). While this is not a significant issue when the expected normal flow rate is 1 GPM or greater (and low flow is just a small time window until it reaches normal speed), this is an issue for low flow 0.5 GPM applications. Without any changes, normal electrical loading such as shown in FIG. 1 at low flow rates would generate very little power.

To resolve this, in accordance with some embodiments, the loading of the turbine/generator could be reduced at low speeds/low flow rates in some embodiments. By sensing and/or determining a characteristic of the electrical power signal from the generator that has a relationship to the rotation speed of the turbine and/or the flow rate of the fluid flow, an algorithm can be created to change the effective generator loading. In some embodiments, the sensed characteristic is a frequency of the electrical power signal, which is a function of a timing of the pulses of the electrical power signal. For example, a control processor or control circuit (e.g., control circuits 26 of FIG. 2) coupled to the generator 10 can easily determine the frequency of the generated AC waveform. In some embodiments, generator loading is a combination of the electrical load required to charge the electrical storage device as well as other variable/discrete loading. The described variable/discrete loading would be electrical impedance. Where an optimized (good for medium or high flow) overall impedance would be good for medium or high flow/speed conditions, having variable or stepped impedance would allow for greater impedance to be enabling greater power generation at highest flow conditions and apply lower impedance to allow for the unit to produce power at lower flow rates/generator speeds.

Figure 2:
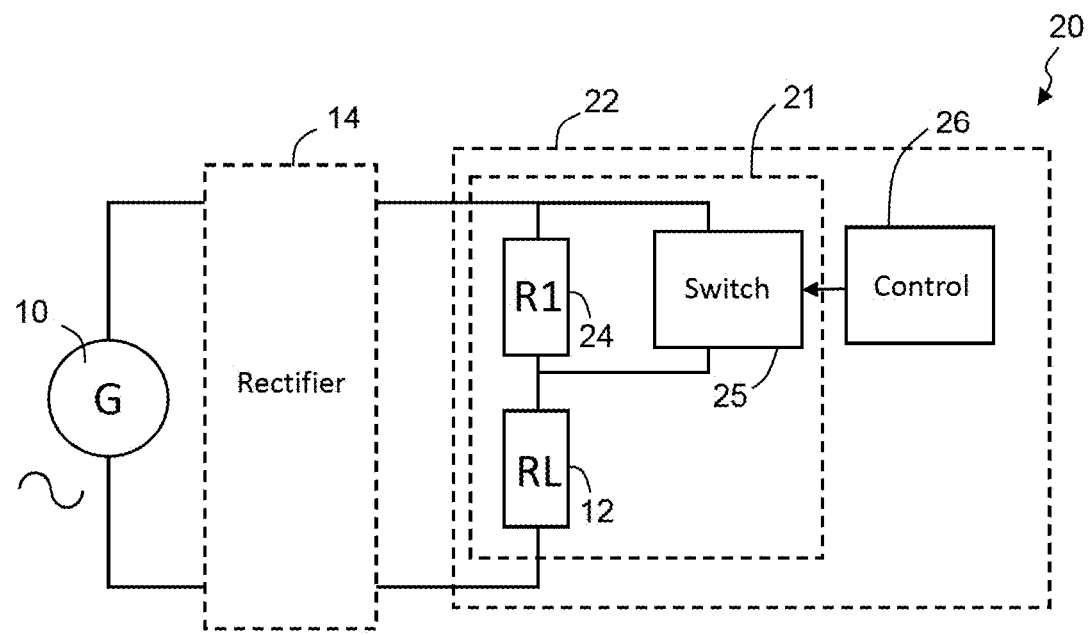
FIG. 2 illustrates a supplemental load that can be selectively applied in series with the nominal load across the hydro-power generator to improve power generation performance across multiple fluid flow rates in accordance with some embodiments.

FIG. 2 illustrates a simplified block diagram of an exemplary hydro-power generation system 20 for an irrigation system, in accordance with some embodiments. Referring to FIG. 2, some embodiments are shown in which the load of a variable load circuit 21 of an energy harvesting circuit 22, device and/or circuit applied to the generator 10 is changed as the flow rate or speed changes. Similar to that shown in FIG. 1, the load 12 is shown as having a load impedance RL, the load 12 representing all circuitry coupled to the generator 10 including the energy harvesting circuit (which can include a battery/capacity charging circuit), where the load impedance RL is the sum of the impedances of the load 12.

For example, a supplemental load providing a supplemental load impedance 24 (e.g., series resistor having supplemental impedance R1) is selectively applied in series with the load 12 (and its nominal load impedance RL) to the charging loop of the hydro-power generator 10 to improve power generation performance across multiple fluid flow rates in accordance with some embodiments. The supplemental load impedance 24 is switched in and out using a switch 25 (e.g., a relay) based on signaling from a control processor or a control circuit 26 when it determines that the flow is low. For example, supplemental load impedance 24 is bypassed (shorted) during normal speeds (medium to high). While a switch 25 is shown, it is understood that any switching device could work, such as a relay, transistor, field effect transistor (FET). In one example, if load impedance RL is 200 ohms, supplemental load impedance R1 could be selected as 200 ohms. It is understood that this is an example resistance and that other values may be used depending on the application. In low flow conditions as detected by the control circuit 26, supplemental load 24 is switched (relay open) into the charging loop to decrease the effective load during low flow. That is, by increasing the effective load impedance (now RL+R1), the current drawn from the generator 10 is reduced. This results in more evenly rotating the turbine to improve power generation. In this example case, the supplemental load impedance R1 together with nominal load impedance RL will provide a total effective load impedance suitable for power generation in the range between 2000-3000 rpm, whereas load impedance RL only will provide suitable power generation for 3000-7000 rpm. In some embodiments, the initial selection of RL of the load 12 is intended to cover the normal higher speeds such that a supplemental load 24 can be switched in series to better support lower turbine speeds/lower flow rates.

In some embodiments, the electrical power signal is converted to a direct current (DC) electrical power signal using a converter circuit, such as a rectifier circuit 14. For example, the generator 10 provides an AC electrical power signal, the rectifier circuit 14 converts this signal to a DC electrical power signal. This may be done in any known manner, such as using a full wave diode bridge rectifier. In some embodiments, rectification is ultimately needed for the energy harvesting circuit to charge a DC power storage source, such as a battery or capacitor. If needed, rectification can occur prior to the signal reaching the load in some embodiments, or rectification can occur as part of the circuitry of the load 12. That is, the supplemental load 24 may be switched after rectification or before rectification. Accordingly, the rectifier circuit 14 is illustrated in dashed lines. As understood, the rectifier circuit 14 may include one or more capacitors to smooth the output.

In some embodiments, the control circuit 26 determines a characteristic of the electrical power signal. While not shown in FIG. 2, the control circuit 26 is coupled to the generator 10 to be able to sense the characteristics of the electrical power signal. In some embodiments, the characteristic corresponds to or has a relationship to a speed of the turbine and/or to a flow rate of the fluid flow in the conduit. In some embodiments, the characteristic comprises a frequency of the electrical power signal although other characteristics may be determined. In some embodiments, the frequency is determined as a function of a timing of the pulses of the electrical power signal. For example, voltage of the electrical power signal is monitored to determine zero-crossings, positive peaks and/or negative peaks in the voltage over a period of time. The period of time may be any duration, e.g., the period of a cycle of the electrical power signal or portion thereof, or a length of time (e.g., to determine a count of zero-crossings or peaks during the length of time). The frequency may be indicated as a value, e.g., may be determined as a value in Hertz (Hz), a numeric count.

The control circuit 26 of the energy harvesting circuit 22 determines the appropriate load impedance for the variable load circuit 21 based on the determined characteristic (e.g., the determined frequency or other characteristic), the appropriate load impedance selectable from a plurality of load impedances (e.g., nominal load impedance RL and a supplemental load impedance R1). In some embodiments, the determination can be a simple lookup (e.g., a lookup table stored in a memory of the control circuit 26). That is, if the characteristic is in a first range, then a first given impedance is selected, if the characteristic is in a second range, then a second given impedance is selected, and so on. In some embodiments, the impedances corresponding to different values of the characteristic are tested in advance and determined for the circuit given its specific load over various flow rates. In one example where the characteristic determined is frequency, a determined frequency within a range of 3000-7000 Hz corresponds to the nominal load RL being selected, and a determined frequency within a range of 2000-3000 Hz corresponds to the nominal load RL+supplemental load impedance R1 being selected.

Once the load impedance is determined, the control circuit 26 provides a control signal to the switch 25 of the variable load circuit 21 to either shunt or add the supplemental load impedance R1 to provide the selected load impedance for energy harvesting. Depending on the implementation, the control signal can be a signal containing data or may be a simple voltage level. It is noted that while the control circuit 26 is shown apart from the load 12, in some embodiments, the functionality of the control circuit 26 may be implemented as a control circuit or other component of the load 12.

While FIG. 2 illustrates that two effective load impedances that may be selected by the control circuit 26, it is understood that additional supplemental load impedances may be provided with additional switchable resistors in series with RL and R1. For example, additional resistors R2, R3, etc. may be provided that are controllable through additional switches.

In some embodiments, the load impedance RL of the load 12 is substantially constant or fixed and is a function of the components selected and their connections in the load. It is further noted that in some embodiments, the load impedance RL of the load 12 may vary over time (e.g., it can have a variable value) since it represents the impedance of any components of the load, and in operation the impedance of one or more components may vary. For example, in the case of the load including a charging circuit to charge a power storage device (e.g., a battery and/or a capacitor), depending on the charging and discharging state of the power storage device, the value of RL may vary over time. Further, impedances may vary based on environmental factors (such as temperature).

Figure 3:
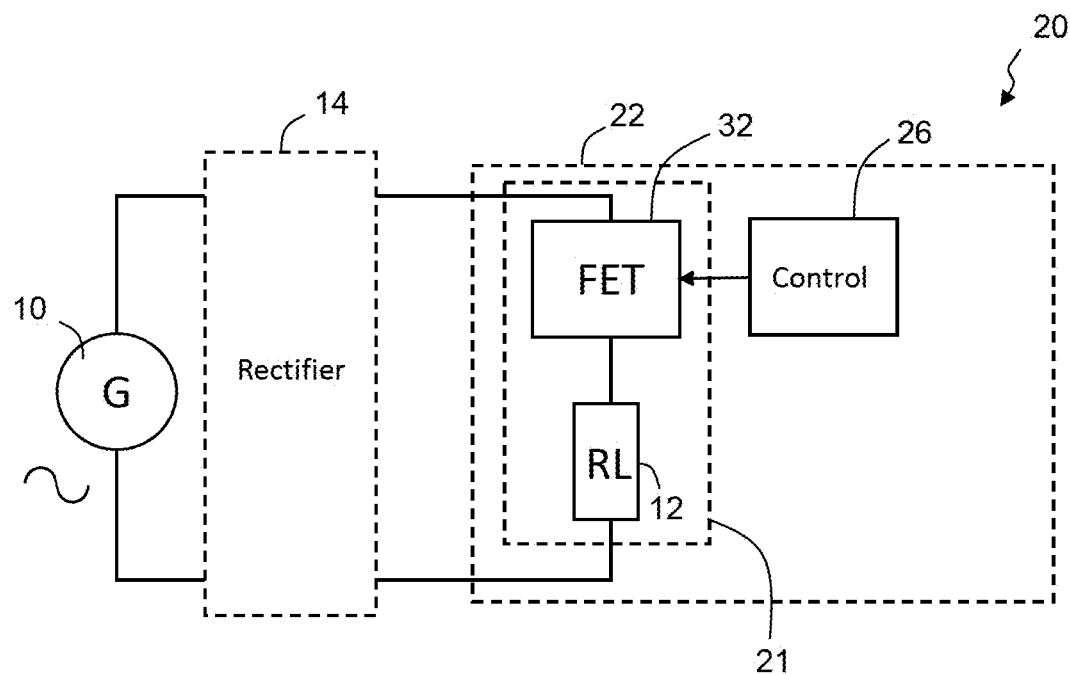
FIG. 3 illustrates a switching circuit in series with a nominal load that can be selectively controlled to improve power generation performance across multiple fluid flow rates in accordance with some embodiments.

FIG. 3 illustrates a simplified block diagram of an exemplary hydro-power generation system 20 for an irrigation system, in accordance with some embodiments. Referring to FIG. 3, in other embodiments, a switch embodied as a transistor 32 (shown as field effect transistor, FET) is connected in series with the load 12 having the load impedance RL in the charging loop. The switching operation of the transistor 32 is under control by the control circuit 26. When the transistor 32 is open (in an open state), the normal effective load impedance is essentially infinite such that no current flows through the load 12. When the transistor 32 is closed (in a closed state), the normal effective load impedance RL of the load 12 is applied. In some embodiments, by controlling the duty cycle of opening and closing the transistor 32, the load of the variable load circuit 21 applied to the generator 10 is varied between high impedance (infinite) and that of RL. For example, if the transistor 32 is opened/closed at a 25% duty cycle (i.e., 75% of the time the resistance/impedance is essentially infinite, and 25% of the time the resistance/impedance is that of RL), the resulting effective load impedance of the charging loop will be more than the value of RL. By increasing the effective load impedance, the current drawn from the generator is reduced which will even the rotation of the turbine in low flow conditions.

In some embodiments, similar to that described above, the control circuit 26 of FIG. 3 determines a characteristic of the electrical power signal. In some embodiments, the characteristic corresponds to or has a relationship to a speed of the turbine and/or to a flow rate of the fluid flow in the conduit. In some embodiments, the characteristic comprises a frequency of the electrical power signal although other characteristics may be determined. In some embodiments, the frequency is determined as a function of a timing of the pulses of the electrical power signal such as described above.

The control circuit 26 of the energy harvesting circuit 22 determines the appropriate load impedance for the variable load circuit 21 based on the determined characteristic (e.g., the determined frequency or other characteristic), the appropriate load impedance selectable from a plurality of load impedances (e.g., by selecting one of multiple duty cycles for the transistor 32 that will each result in an effective load impedance). For example, example duty cycles that will result in different load impedances could be selected from 0%, 25%, 50%, 75%, 100% open/closed. Note that at 0% duty cycle, the generator is shorted all of the time, and at 100%, the generator 10 is always on and the load impedance will be that of RL. In some embodiments, the determination can be a simple lookup (e.g., a lookup table stored in a memory of the control circuit 26). That is, if the characteristic is in a first range, then a first given impedance is selected, if the characteristic is in a second range, then a second given impedance is selected, and so on. In some embodiments, the impedances corresponding to different values of the characteristic are tested in advance and determined for the circuit given its specific load over various flow rates. In one example where the characteristic determined is frequency, a determined frequency within a range of 3000-7000 Hz corresponds to a duty cycle of 100% resulting in the nominal load RL being selected, and a determined frequency within a range of 2000-3000 Hz corresponds to a duty cycle of 50% resulting in the nominal load RL+an additional load impedance being selected.

Once the load impedance is determined, the control circuit 26 provides a control signal to the transistor 32 of the variable load circuit 21 to open and close the transistor 32 at the desired duty cycle to provide the selected load impedance for energy harvesting. Depending on the implementation, the control signal can be a signal containing data or may be a simple voltage level. And, similar to that described in FIG. 2, if needed, the rectifier circuit 14 can be used prior to the transistor, or can be included in the circuitry of the load 12. And similar to that described above, the values of one or more of the various impedances may vary over time.

Figure 4A:
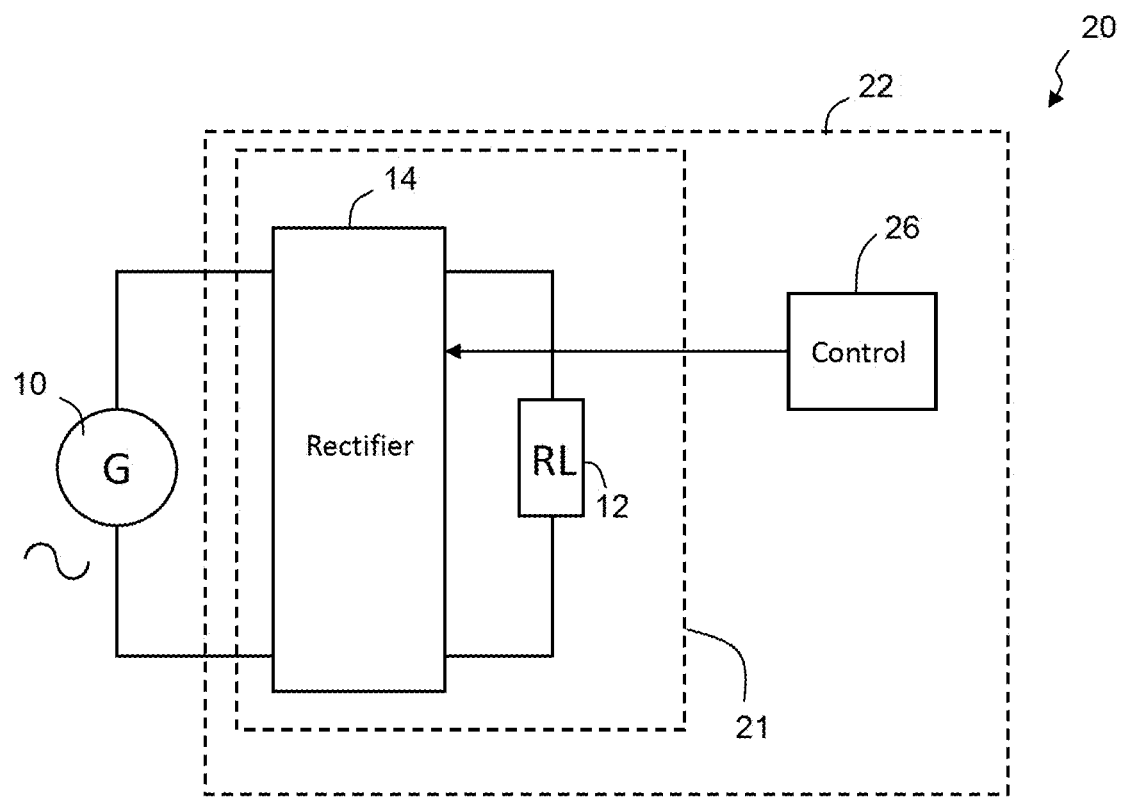
FIGS. 4A, 4B, and 4C illustrate a circuit that selectively controls rectification of the electrical power signal from the generator to improve power generation performance across multiple fluid flow rates in accordance with some embodiments.
Figure 4B:
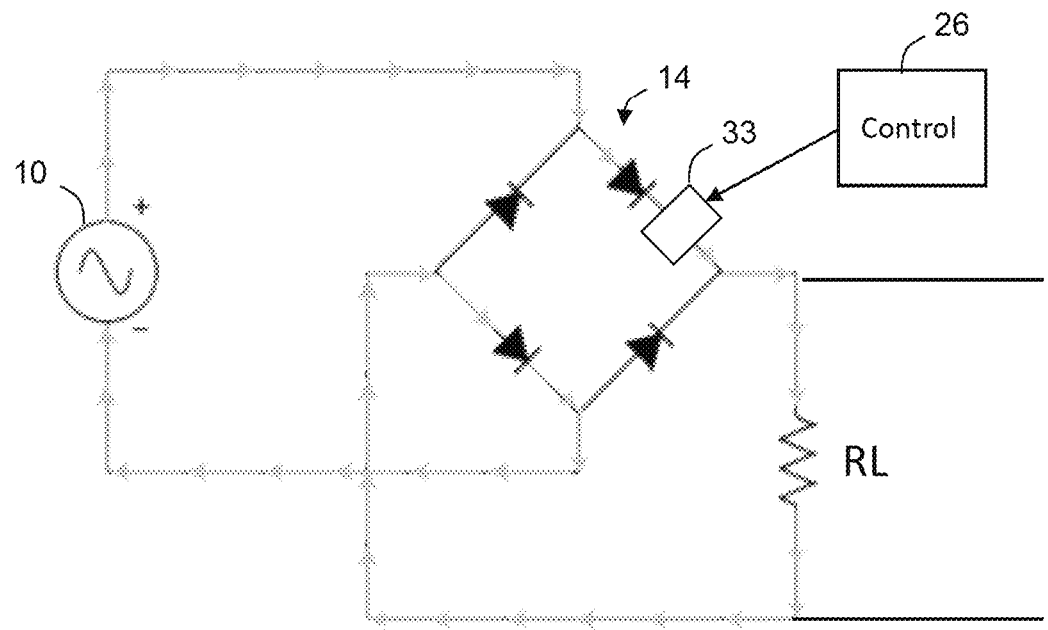
Figure 4C:
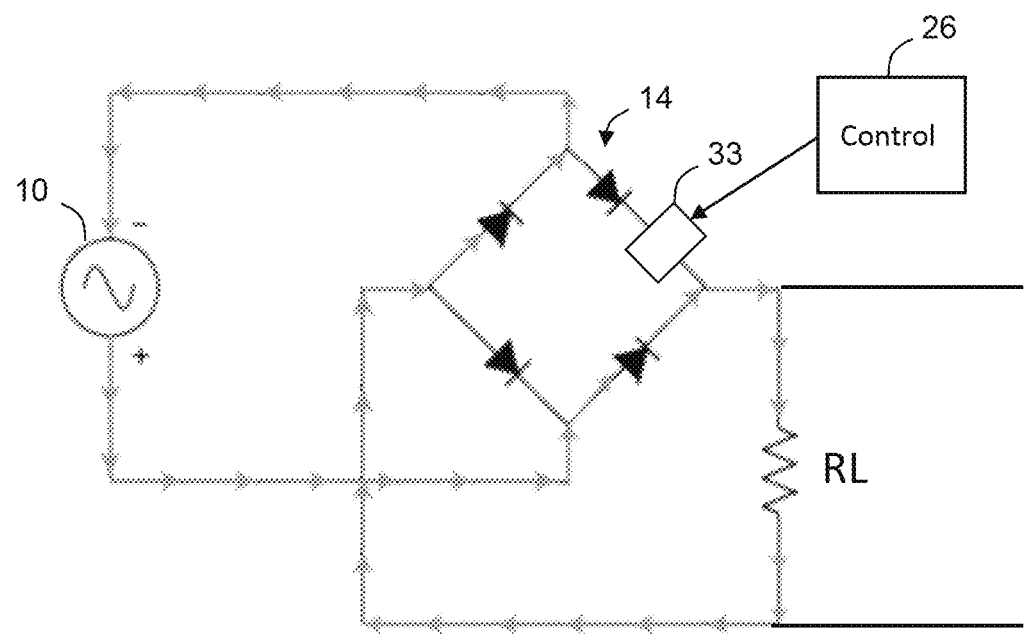

Referring next to FIGS. 4A, 4B, and 4C, a circuit is shown that selectively controls rectification of the electrical power signal from the generator to improve power generation performance across multiple fluid flow rates in accordance with some embodiments. For example, in some embodiments, the output electrical signal from the generator 10 could be selectively rectified to vary the load in some embodiments. FIG. 4A shows the control circuit 26 providing a control signal to the rectifier circuit 14 to selectively control rectification. For example, rectification of output signal could periodically change from full wave rectification to half wave rectification. In some embodiments, when the turbine speed (RPM) is low, half wave rectification would be deactivated at various poles. This could be accomplished by open circuiting the signal for negative or positive electrical signals. For example, as shown in FIGS. 4B and 4C, four diodes of a typically full bridge diode rectifier circuit are used for full wave rectification of an AC signal from the generator 10. And a switch 33 (e.g., relay/transistor/FET) is coupled in series with one of the half bridge paths. In FIGS. 4B and 4C, the switch 33 is located in the positive diode path. By opening the switch 33, the rectifier circuit 14 may be modified to only have two effective diodes. When the switch 33 is closed, rectification occurs on both the positive and negative portions of the AC electrical power signal. And when the switch 33 is open, the positive diode path is open, and rectification only occurs on the negative diode path. Thus, the effective load impedance is increased and less current is drawn from the generator 10. In some embodiments, the duty cycle of switching between full and half wave rectification can be controlled similar to controlling the duty cycle of the transistor 32 of FIG. 3. Essentially, the circuit is using part of the cycle, and discarding the other part of the cycle, so that there is 50% less resistance to turning. In some embodiments, different duty cycles can provide different load impedances and current draws. For example, the control circuit 26 of the energy harvesting circuit 22 determines the appropriate load impedance for the variable load circuit 21 based on a determined characteristic of the electrical power signal (e.g., determining the frequency of the signal which corresponds to the turbine speed and/or the flow rate), the appropriate load impedance being selectable from a plurality of load impedances (e.g., by selecting one of multiple duty cycles for the switch 33 that will each result in an effective load impedance). For example, example duty cycles that will result in different effective load impedances could be selected from 0%, 25%, 50%, 75%, 100% open/closed. Note that at 0% duty cycle, the positive diode path is shorted all of the time, and at 100%, both positive and negative diode paths provide current and the load impedance will be that of RL. The control circuit 26 provides a control signal to the switch 33 of the variable load circuit 21 to open and close the switch 33 at the desired duty cycle to provide the selected load impedance for energy harvesting. Depending on the implementation, the control signal can be a signal containing data or may be a simple voltage level.

In some embodiments, power generation performance may be used via a combination of one or more or all of these described above to change the load impedance to the generator 10 based on the flow. For example, the load impedance is changed when the flow speed is low. Once the frequency of the electrical power signal (which corresponds to the rotation of the turbine) is determined to be in "normal" range (e.g., 3000-7000 Hz), these methods could be electrically turned off in the circuit. And as noted above, in some embodiments, the frequency of the electrical power signal can be easily determined as described above.

Figure 5:
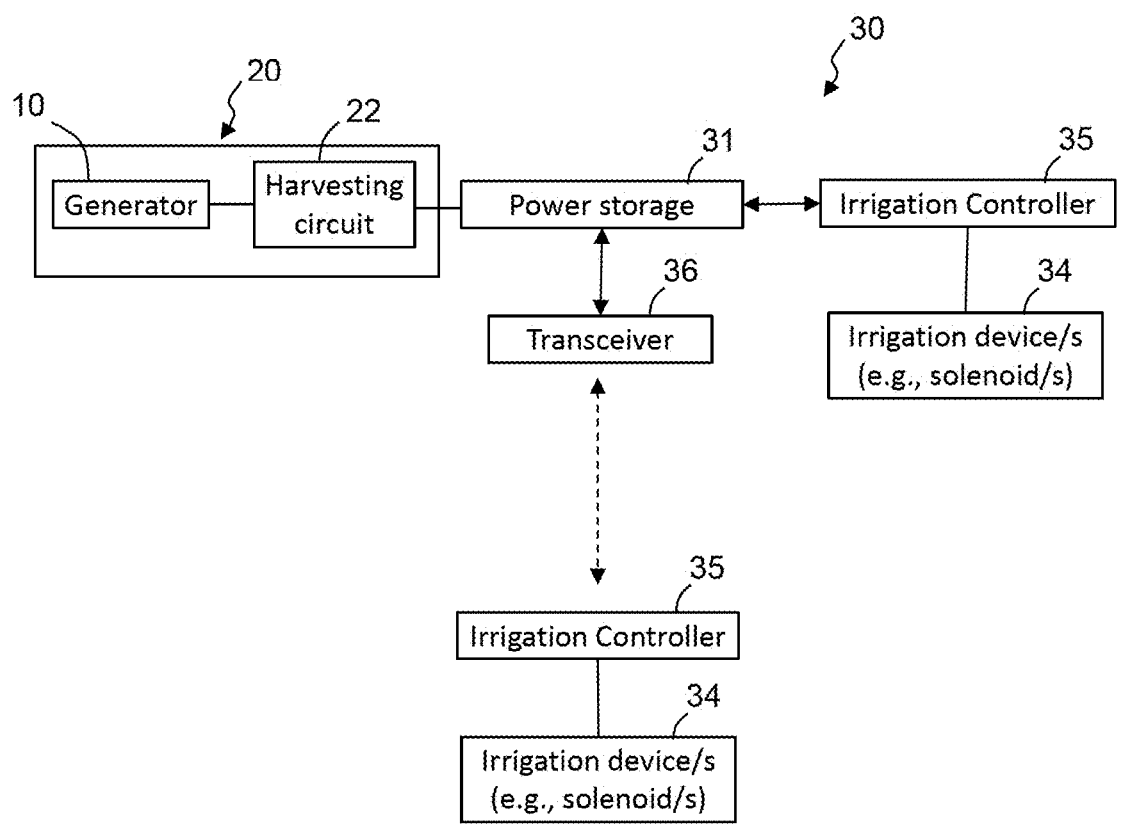
FIG. 5 illustrates a simplified block diagram of an exemplary irrigation system with an exemplary hydro-power generation system in accordance with some embodiments.

FIG. 5 illustrates a simplified block diagram of an exemplary irrigation system 30 with an exemplary hydro-power generation system 20, in accordance with some embodiments. A generation system 20 includes a generator 10 coupled with a power harvesting system such as an energy harvesting circuit 22 (which includes a charging circuit) that operates to modify a load for the generator 10 to improve and/or optimize power draw from the generator 10. Power harvested by the energy harvesting circuit 22 can be supplied by the charging circuit to and stored in one or more power storage systems 31 (e.g., capacitor(s), battery(ies), etc.). In some embodiments, the irrigation system 30 can include one or more irrigation controllers 35 that can receive operational power from the power storage systems 31 and control one or more irrigation devices 34 (e.g., irrigation valves, solenoids, actuators, sensors, gates, pumps, etc.). In some embodiments, the irrigation controller 35 can be a simple control device programmed turn on and off watering at stored times or in response to a user providing manual commands to the controller. Some embodiments include one or more wired and/or wireless transceivers 36 powered by the power storage system 31 and communicating information with one or more remote devices and/or systems (e.g., one or more remote irrigation controllers 35).

Braking

Referring to FIGS. 6-11, several embodiments are described that relate to improving power generation by a hydro-power generator to improve power generation performance across multiple fluid flow rates by providing various approaches to electronically brake the turbine in relatively high fluid flows.

In some embodiments, excessive rotational speed in an irrigation water turbine can lead to premature component failures. In some embodiments, methods are provided to reduce the rotational speed of the turbine in order to prevent component failure and/or extend the life of the turbine. High flow can be the result of unintended high pressure upstream or from the intended application of high pressure or high flow (such as is common in the "winterization" of an irrigation system).

Figure 6:
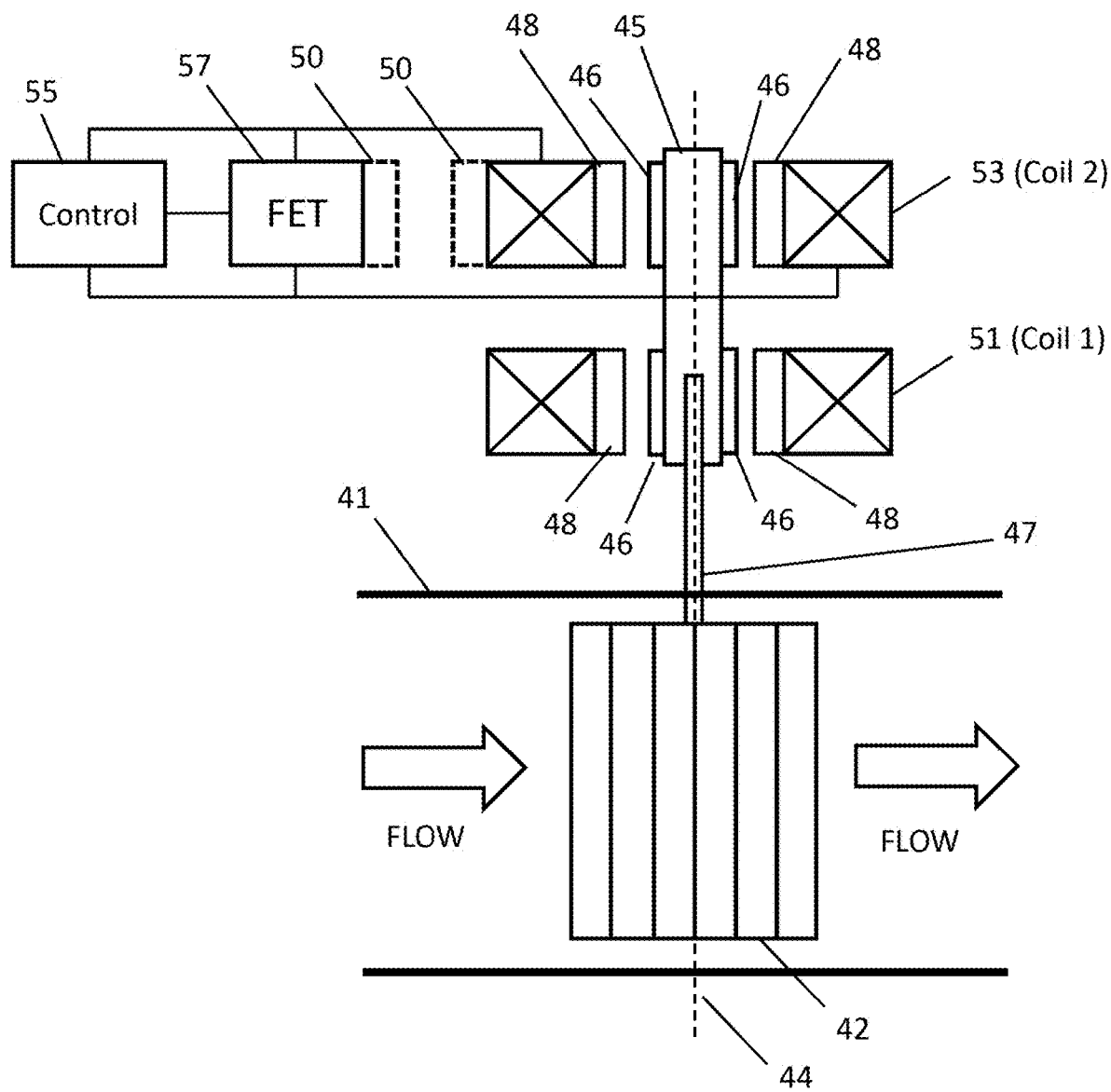
FIG. 6 illustrates a system providing electrical braking to a turbine of a hydro-power generator by selectively shorting a coil of the generator in certain flow conditions in accordance with some embodiments.

Referring first to FIG. 6, a system is shown for providing electrical braking to a turbine of a hydro-power generator by selectively shorting a coil of the generator in certain flow conditions in accordance with some embodiments. That is, some embodiments provide an electronic speed control system or electrical braking system. The system includes a flow path within which a turbine 42 is at least partially inserted into the fluid flow path of a conduit 41 of the irrigation system (illustrated as being fully inserted into the fluid flow path of an irrigation conduit 41). The turbine 42 rotates about an axis 44 in response to flowing water in the conduit 41. A rotor 45 is connected to the turbine via coupler 47 and rotates with the turbine 42, the rotor 45 having permanent magnets 46 having alternating north and south poles. The magnets 46 rotate within the inner circumference of a coil. FIG. 6 shows two coils 51 and 53 (coil 1 and coil 2). The inner periphery of each coil includes metal fingers 48 spaced about the periphery. As the magnets 46 rotate about the fixed fingers 48/fixed coil, an electrical power signal, i.e., an AC waveform, is generated in the coils. The AC waveform is the generated power which can be rectified and used to power devices and/or stored to power devices. A characteristic (such as the frequency) of the waveform can be detected by a control circuit 55, such as described above. When a characteristic threshold (e.g., frequency threshold) of the characteristic is exceeded, this can indicate that the speed is too high for the application as determined by the control circuit which indicates that the flow rate of the fluid flow is high. For example, in some embodiments, a frequency threshold can have a value, such as 9000 Hz. If the frequency of the electrical input signal exceeds 9000 Hz, then this indicates that the flow rate is too high, and braking should be applied. In such case, the control circuit 55 can selectively operate a switching device or switch (such as FET 57) to apply a direct short across the generator coil 53. In the illustrated embodiment, the short is applied to coil 53

(coil 2). This results in the electrical braking of the turbine since less current is being drawn (i.e., current is only drawn from coil 51) to slow the turbine in the presence of high flow. In some embodiments, such electrical braking can cause an increased production of heat and optional heat sinks 50 can be used in proximity to the FET 57 and/or the coil 53 to help dissipate heat. As known, heat sinks 50 may directly contact (or indirectly via thermal conducting paste) the FET 57 and/or the coil 53. It is noted that the coil 51 (coil 1) can also be shorted to provide additional braking.

Figure 7:
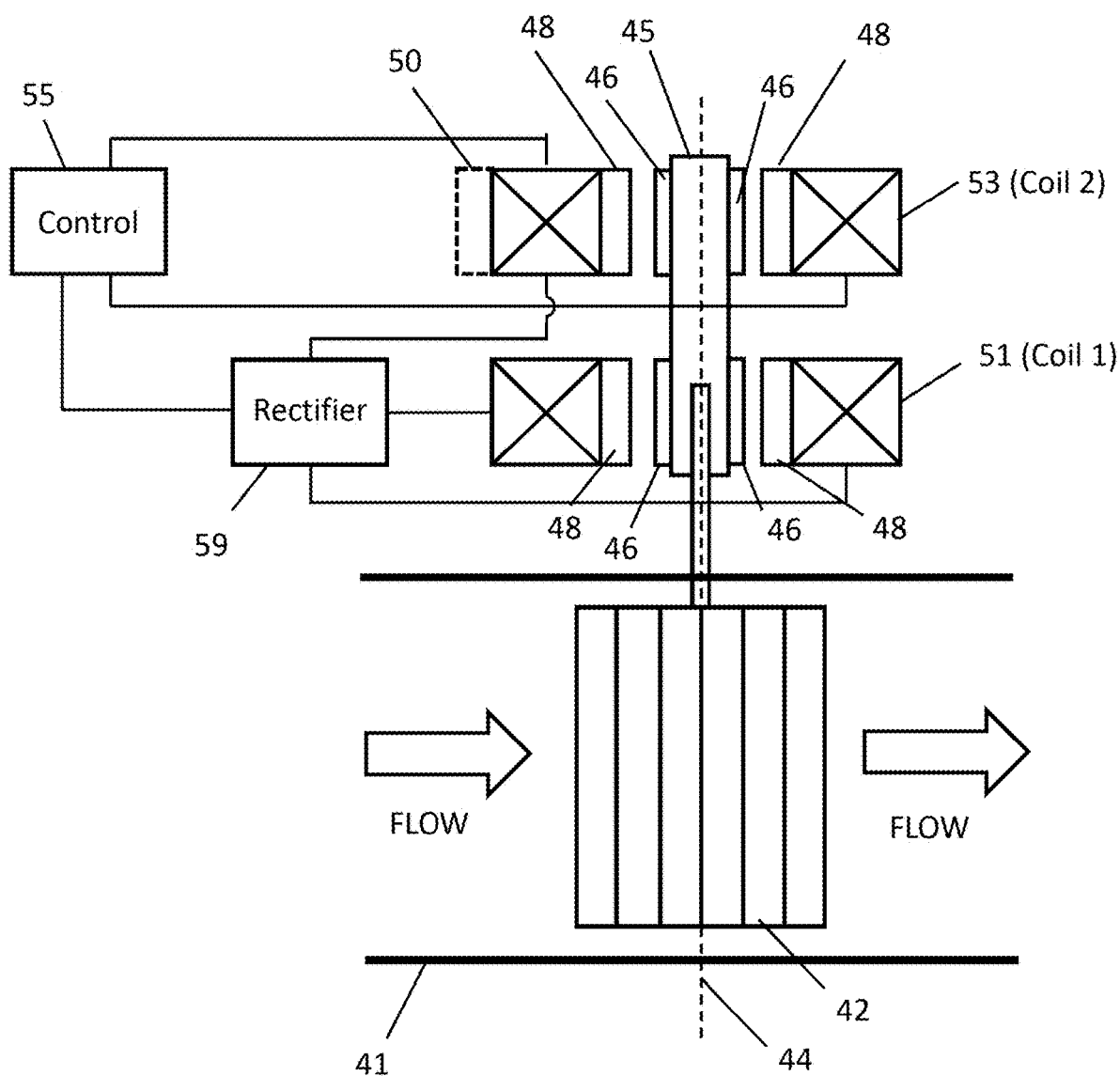
FIG. 7 illustrates a system providing electrical braking to a turbine of a hydro-power generator by selectively applying power to a coil of the generator in certain flow conditions in accordance with some embodiments.

FIG. 7 illustrates another system providing electrical braking to a turbine of a hydro-power generator by selectively applying power to a coil of the generator in certain flow conditions in accordance with some embodiments. In these embodiments, when the control circuit 55 determines that the turbine rotation speed/fluid flow rate is too high (e.g., by determining that a characteristic (e.g., frequency) of the electrical power signal exceeded a characteristic threshold (e.g., frequency threshold)), the control circuit 55 causes the power from one coil (coil 51) to be rectified using a rectifier circuit 59 to create a DC voltage that is then applied (e.g., switched) to the other coil (coil 53). The current created by this DC voltage would be stronger than the shorted coil of the generator. Done this way, the faster the turbine speed, the higher the voltage output, the higher the current that would then be applied to the second generator coil. With two generators, the output power would be higher throughout the entire speed range of the generator. It is noted that heat sinks 50 may also be used to help dissipate heat. Accordingly, in some embodiments, the control circuit 55 determines, based on a characteristic of the electrical power signal and a characteristic threshold, that a flow rate of the fluid flow is too high for the intended application. And then, the control circuit is configured to output the control signal to the rectifier circuit 59 to cause the rectifier circuit to output a DC voltage signal to the second coil to cause the electrical braking of the turbine, wherein the DC voltage signal is rectified from the electrical power signal of the first coil.

Figure 8:
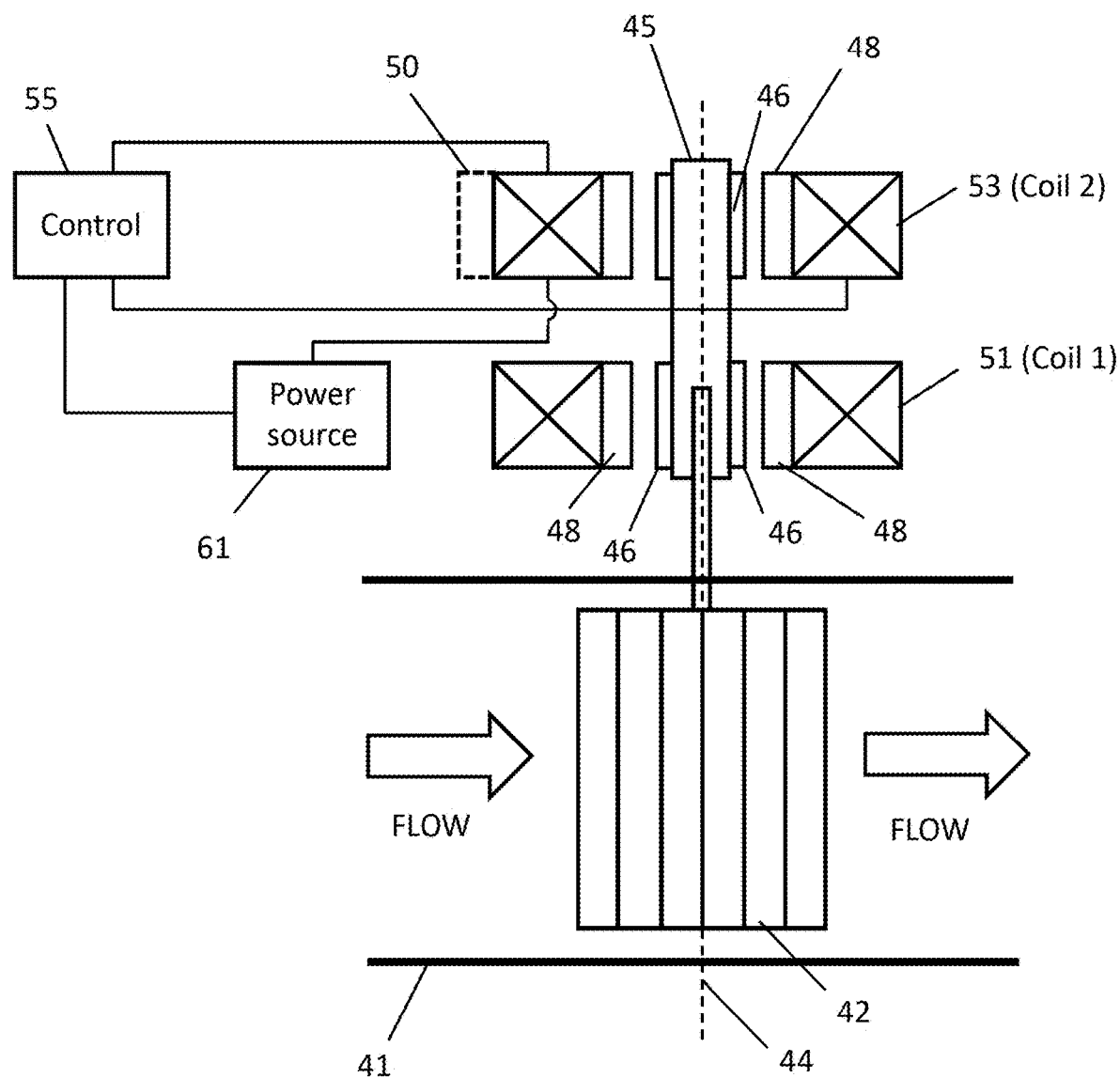
FIG. 8 illustrates a system providing electrical braking to a turbine of a hydro-power generator by selectively applying power to a coil of the generator in certain flow conditions in accordance with some embodiments.

FIG. 8 illustrates another version where DC power from a power source 61 (such as a battery or capacitor) is provided to the coil in the event of high flow as determined by the control circuit 55. When high flow is detected such as described above, the control circuit 55 causes the power source 61 to output DC power to the coil 53 (e.g., switches the power source 61 to the coil). In some cases, and depending on the power source, this is helpful when the need for DC power is short term. In the case when a system is being winterized either suitable power supply will be needed to provide power for the duration of the flow condition or another approach such as shown in FIG. 7 may be better suited. It is noted that power could be provided to both coils to provide additional braking. Accordingly, in some embodiments, the control circuit 55 determines, based on the electrical power signal, that a flow rate of the fluid flow is high (e.g., a characteristic of the electrical power signal exceeds a characteristic threshold). And then, the control circuit is configured to output the control signal to the power source 61 to cause the power source 61 to output a DC voltage signal to the second coil to cause the electrical braking of the turbine, wherein the DC voltage signal is provided by the power source 61.

In some embodiments, one or more or all of the approaches of FIGS. 6-8 may be combined to cause suitable electrical braking.

Figure 9:
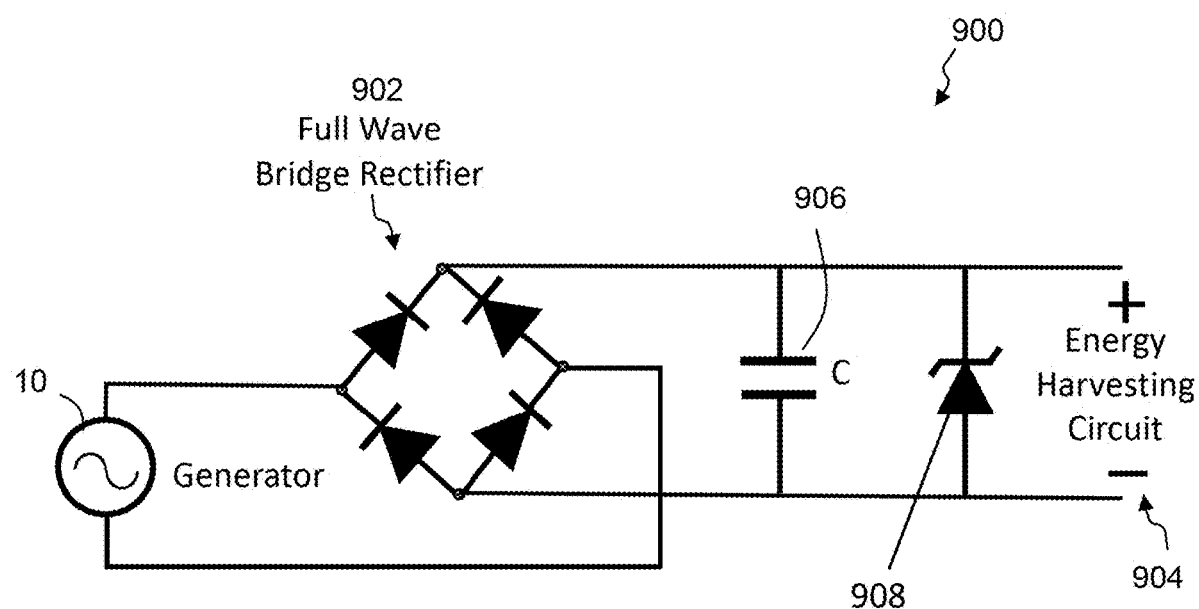
FIG. 9 illustrates a simplified circuit diagram of motor speed controlling circuit including a diode configured to limit the rotation speed of the motor in the presence of high flow conditions in accordance with some embodiments.
Figure 10:
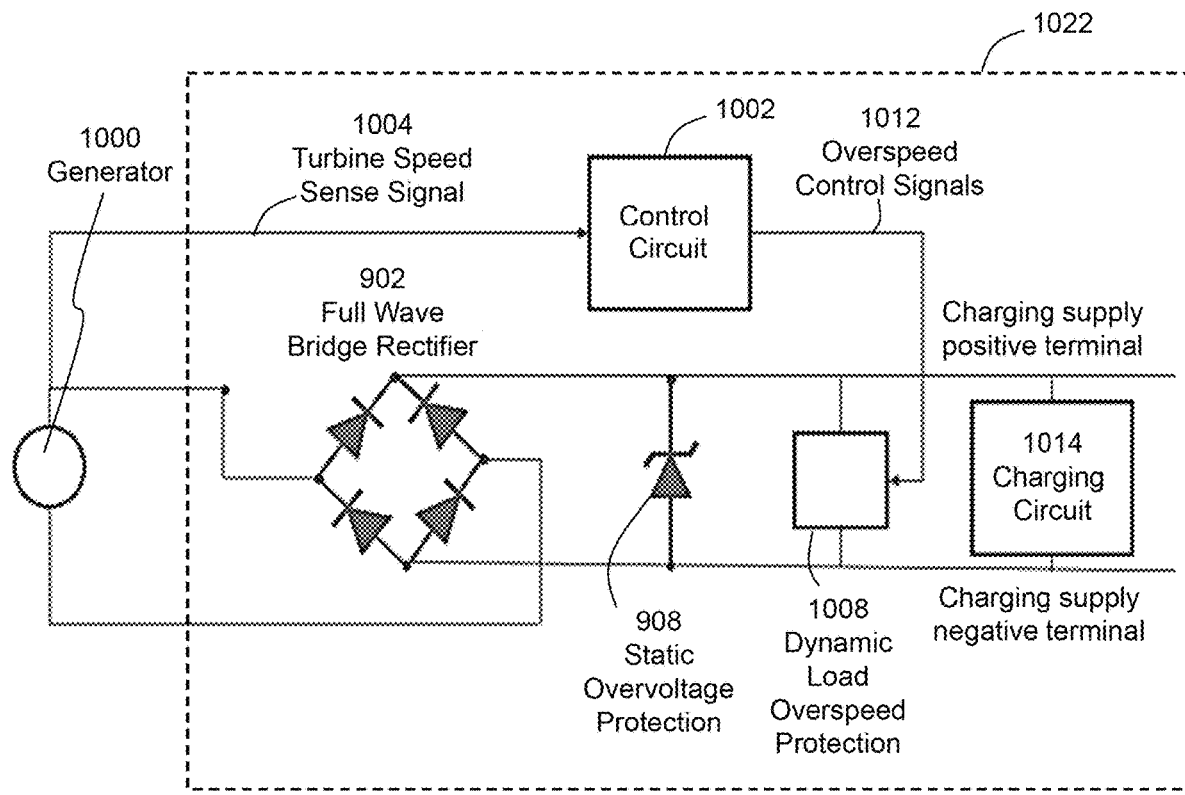
FIG. 10 illustrates a simplified circuit diagram of circuitry to protect the hydro-power generator and turbine from overvoltage conditions and also from high speed (overspeed) conditions in accordance with some embodiments.

Referring to FIGS. 9-11, several embodiments are described that relate to a hydro-power generator and further including protection from overvoltage and/or overspeed conditions.

In some cases, the energy consumption of autonomous irrigation devices utilizing wireless radio communications to an irrigation controller in order to activate and report on its operational status requires power to recharge the energy storage systems. In some embodiments, a device will harvest electrical energy in the form of a DC voltage and current provided by the mechanical action of an impeller embedded in the irrigation system flow path that is directly coupled to a DC generator equipped with an AC wave rectifying circuit in order to provide DC voltage based power. In combination with the energy harvesting aspect, in some embodiments, the voltage magnitude being generated can be utilized as a signal to indicate the rotational speed of the rotor and correlate this to the flowrate through the irrigation pipe and thus be used as a flow sensor. And, due to the fact that in some embodiments, the device is meant to be fully entrenched in the main flow path of the irrigation system it will be subjected to annual water evacuation methods using highly pressurized air that will rotate the impeller and DC generator at extremely high rotational speeds (e.g., during winterization to blow out the system in which cases, the turbine speed can exceed 10,000 RPM). Given that there are inherent imbalances in any impeller and DC Motor based rotor system, catastrophic damage could occur with excessive rotational speed. Accordingly, in some embodiments, such as shown in FIG. 9, a power generation device 10 will utilize a Zener diode 908 attached in parallel to the motor voltage supply with a breakdown voltage slightly above the normal operating voltage of the generator 10 in order to shunt the extra power to electrical ground and induce a significant load on the motor. This increased load will slow down the rotational speed of the rotor and impeller subassembly since less current will be drawn, thus preventing irreversible damage to the energy harvesting device.

In some embodiments, reliable hydro-power generation that will last allows for autonomous operation of irrigation based mechanical devices such as valves, controllers, water meters, flow sensors, radio communication systems and various water flow based sensors in a compact design. In some embodiments, energy harvesting can be combined with a water based flow sensor. And in some embodiments, the ability to limit the rotational speed of the unit under severe pressure and flow rate conditions is provided in order to preserve the unit from functional damage, thus limiting its intended life.

FIG. 9 illustrates simplified circuit diagram of a motor speed controlling circuit 900 including a Zener diode 908 configured to limit the rotation speed of the motor in the presence of high flow conditions in accordance with some embodiments. As shown, the AC signal generated by the generator 10 is rectified (e.g., using a full wave bridge rectifier 902) and smoothed using a capacitor (C) 906 or other smoothing circuitry to provide a DC voltage used for the energy harvesting circuit 904 such as a charging circuit including one or more batteries and/or capacitors. In some embodiments, a Zener diode 908 wired in reverse bias orientation that has an activation voltage near to the maximum operating voltage to control motor speed through regulated voltage across and current through the field windings. Therefore, with the Zener diode 908, the variable voltage generated by the motor and in particular a higher voltage generated when rotating at higher speeds, is regulated or limited by the Zener diode 908. That is, as the speed of the turbine increases, the voltage level of the DC voltage out from the rectifier 902 and capacitor 906 increases. When it reaches the activation or breakdown voltage of the Zener diode 908, the Zener diode opens and shunts the voltage to ground increasing the current drawn from the motor which results in the slowing of the motor and turbine in high flow scenarios. An energy harvesting circuit 904 is coupled to the converter circuit and configured to harvest energy based on the direct current electrical power signal. And a diode (e.g., Zener diode 908) is coupled to the converter circuit and the energy harvesting circuit and configured to open and shunt the direct current electrical power signal to ground when a voltage level of the direct current electrical power signal exceeds a breakdown voltage of the diode resulting in an electronic braking of the turbine.

Accordingly, in some embodiments such as shown in FIG. 9, an overvoltage protection system that can be used for braking the turbine in high flow conditions includes a generator 10 comprising a turbine at least partially inserted into a fluid flow path of a conduit of the irrigation system and configured to be activated by a fluid flow in the conduit. The generator 10 is configured to output an electrical power signal in response to the activation of the turbine. A converter circuit (e.g., full wave bridge rectifier 902) is coupled to the generator and is configured to convert the electrical power signal to a direct current electrical power signal. Next, an energy harvesting circuit coupled to the converter circuit is configured to harvest energy based on the direct current electrical power signal. Then, in operation, when the direct current electrical power signal exceeds a breakdown voltage of the diode, the diode opens and shunts the direct current electrical power signal to ground resulting in an electronic braking of the turbine. In some embodiments, this is referred to as a static overvoltage protection system.

In other embodiments, FIG. 10 illustrates a simplified circuit diagram of circuitry to protect the hydro-power generator 1000 (e.g., an alternator providing an AC signal) and turbine from overvoltage conditions and also from high speed (overspeed) conditions. The AC signal from the turbine alternator is full wave rectified using a converter circuit, such as a full wave bridge rectifier 902 and voltage smoothing capacitor (not shown). In one embodiment, MOSFETs are used instead of diodes in the rectifier 902 for greater conversion efficiency. Similar to that shown in the embodiments of FIG. 9, a Zener diode 908 is coupled across the DC voltage at the charging supply positive and negative terminals of the charging circuit 1014. When the breakdown voltage of the Zener diode 908 is exceeded, e.g., due to overvoltage conditions, the Zener diode 908 shunts the signal to ground to slow the motor and protect the components. This provides overvoltage protection similar to that described in FIG. 9.

Figure 11A:
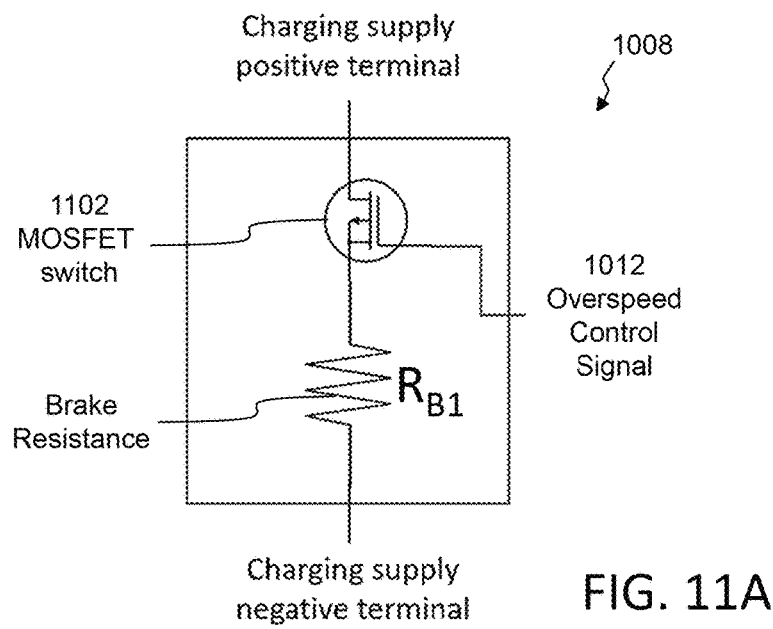
FIGS. 11A and 11B illustrate exemplary simplified overspeed protection circuits for use in the circuitry of FIG. 10 in accordance with some embodiments.

In some embodiments, a control circuit 1002 (such as a microcontroller) also senses turbine speed through a combination of voltage and/or frequency of the incoming AC signal 1004. For example, the control circuit 1002 senses a characteristic (e.g., frequency) of the electrical power signal and determines if the characteristic value exceeds a characteristic threshold. If a generator is used instead of an alternator, then voltage and the primary frequency component (using an FFT (Fast Fourier Transform) or other filtering means) imposed on the DC voltage generated would indicate impeller speed (and flow rate of the fluid flow). If the control circuit 1002 detects excessive turbine speed (e.g., when a frequency of the electrical power signal exceeds a frequency threshold), then it activates the dynamic load overspeed protection circuit 1008 through overspeed control signals 1012. In one embodiment, this overspeed protection circuitry includes one or more MOSFETs parallel connected in shunt (ground). A single MOSFET 1102 of the dynamic overspeed protection circuit 1008 is shown in FIG. 11A. The control circuit 1002 modulates the overspeed control signal 1012 connected to the MOSFET gate that is proportional to the degree of overspeed using as but one means time based digital control such as pulse width modulation. Other embodiments may use load control means that are analog instead of time based digital control. In some embodiments, speed control can be implemented more linearly using the properties of operation of a MOSFET as a voltage controlled resistance. In some embodiments, the value of the signal at the gate of the MOSFET 1102 dictates the resistance of the MOSFET 1102, shown in FIG. 11A as $R_{B1}$. For example, when the MOSFET parameters are constrained to operate the device within its linear or triode region, the amount of resistance presented between source and drain terminals of the MOSFET 1102 is given by $(v_{GS}-v_{TH})/K_n$, where $v_{GS}$ is the gate to source voltage, $v_{TH}$ is the gate threshold voltage and $K_n$ is the transconductance parameter. Both $v_{TH}$ and $K_n$ are characteristic properties for the particular MOSFET 1102 being used. By performing a proportional integral derivative (PID) or other closed loop control process sensing a characteristic (e.g., frequency) of the AC electrical power signal from the generator or alternatively, a characteristic (e.g., the frequency) of the ripple component of the rectified DC voltage from the rectifier circuit 902, the resistance created by the MOSFET 1102 can be linearly varied to vary the resistive load (RB) applied to the generator 1000 and thusly maintain the turbine speed of the generator 1000 to remain below a preset limit. In some embodiments, it can be further managed to also maintain the DC voltage level from the rectifier circuit 902 to a determined value to provide automatic voltage regulation of the DC supply for the purposes of power supply to electronic devices or, by appropriately varying a regulation point, a power supply to perform automated battery charging and battery charge maintenance, thereby also performing the function of element 1014. That is, in some embodiments, the overspeed protection circuit 1008 can be controlled by the control circuit 1002 (which continually evaluates the electrical power signal) to control the speed of the turbine and also regulate the overspeed protection circuit 1008 to provide the desired current and voltage needed to charge a power storage device (e.g., a battery and/or capacitor). Thus, in these embodiments, the function of the control circuit 1002 and the overspeed protection circuit 1008 includes or absorbs the function of the charging circuit 1014 such that a separate charging circuit 1014 is not needed. And in some embodiments, the diode 908 is provided as a failsafe device in case the dynamic load overspeed protection circuit 1008 or control circuit 1002 is somehow unable to keep the speed below its limit of control.

Figure 11B:
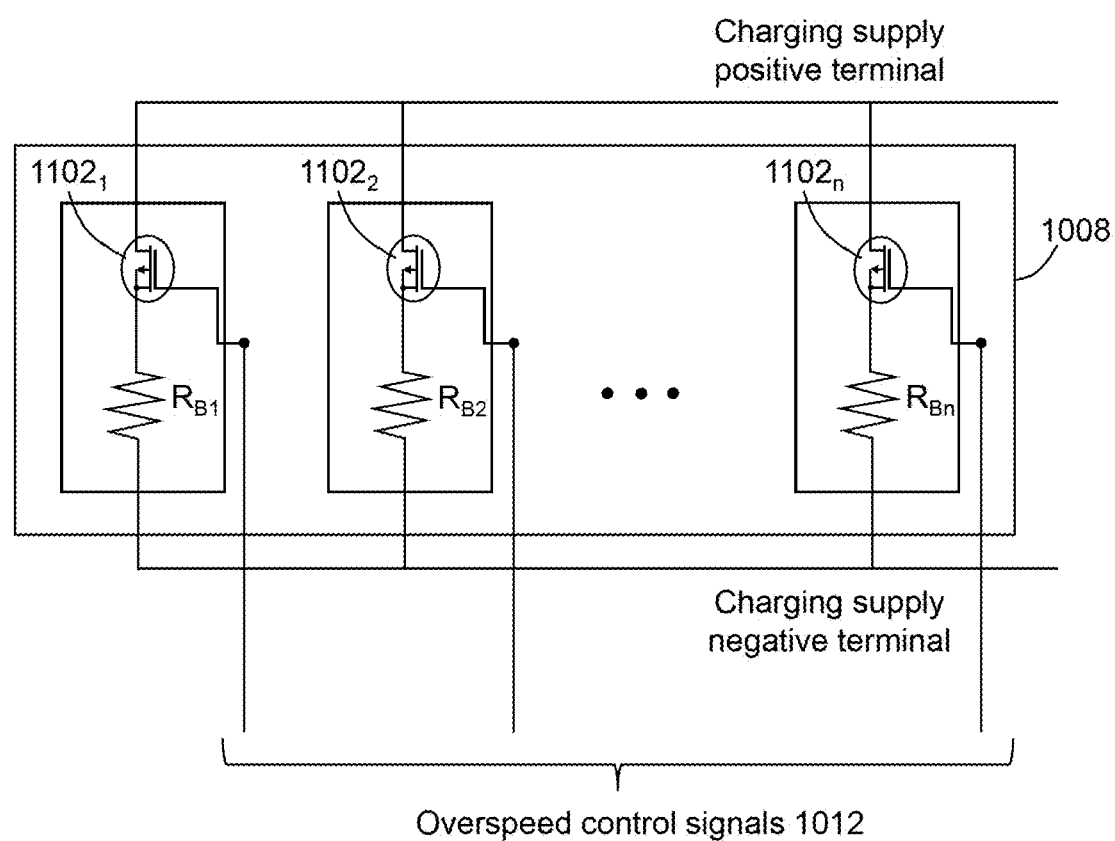

In some embodiments, such as shown in FIG. 11B, multiple MOSFETs $1102_1$-$1102_n$ each having a variable resistance $R_{B1}$-$R_{Bn}$ are connected in parallel and overspeed control signals 1012 may be applied by the control circuit 1002 to one or more of the MOSFETs to provide the intended impedance of the overspeed protection circuit 1008. This allows for the control of how much braking to apply to the motor. For example, in normal operation, the control signals 1012 cause each MOSFET to be an open circuit (infinite impedance). When high flow is detected (such as described above), control signals 1012 can be applied to at least partially close one or more MOSFETs 1102 each providing a respective impedance in parallel with each other and the charging circuit 1014. As the impedance of the overspeed protection circuit 1008 is lowered, this causes an increase in the current drawn from the generator 1000 creating an opposing torque to brake the motor. In some embodiments, multiple levels of braking may be provided. For example, if the turbine speed exceeds 9000 RPM, then the control circuit 1002 switches on one MOSFET having an impedance of $R_{B1}$ to provide a first level of braking. If the turbine speed exceeds 10000 RPM, then the control circuit 1002 switches on two MOSFETs 1102 having an impedance of $R_{B1}$ in parallel with $R_{B2}$ to provide a second level of braking. And if the turbine speed exceeds 11000 RPM, then the control circuit 1002 switches on three MOSFETs 1102 having an impedance of $R_{B1}$ in parallel with $R_{B2}$ and $R_{B3}$ to provide a third level of braking. As the number of MOSFETs 1102 turned on increases, the lower the resistance in the overspeed protection circuit 1008. This causes an increase in the current drawn from the generator 1000 creating an opposing torque to brake the motor. This provides overvoltage protection. Other embodiments may place the dynamic load overspeed protection before the full wave bridge rectifier 902. These embodiments may employ components such as MOSFETs, IGBTs, triacs, SCRs, BJTs or other controllable electrical loads or load switching devices.

Accordingly, in some embodiments such as shown in FIG. 10-11B, an overvoltage protection system that can be used for braking the turbine in high flow conditions includes a generator 1000 comprising a turbine at least partially inserted into a fluid flow path of a conduit of the irrigation system and configured to be activated by a fluid flow in the conduit. The generator 1000 is configured to output an electrical power signal (e.g., an AC signal) in response to the activation of the turbine. A converter circuit (e.g., full wave bridge rectifier 902) is coupled to the generator and is configured to convert the electrical power signal to a direct current electrical power signal. Next, an energy harvesting circuit (including a charging circuit for example) is coupled to the converter circuit and is configured to harvest energy based on the direct current electrical power signal. An overspeed protection circuit is coupled across the converter circuit and the charging circuit, the overspeed protection circuit comprising a variable load impedance (e.g., one or more MOSFETs 1102 having a variable impedance RB) depending on the control signal/s 1012 from the control circuit 1002. The control signals provided to the overvoltage protection circuit 1008 cause it to alter (e.g., decrease) an impedance of the variable load impedance of the overspeed protection circuit 1008 to cause the electrical braking of the turbine. Generally, an increase in the impedance RB will result in a decrease in current drawn from the generator 1000 (for less braking), and a decrease in the impedance RB will result in an increase in current drawn from the generator 1000 (for more braking).

Filter Debris Removal

Referring to FIGS. 12-24, several embodiments are described that relate to removing accumulated debris of water debris filters in the water flow path. Filtering can be important in irrigation applications with small clearances. In this case of solenoids, filtering can be accomplished with fine filters located in water path going to solenoid or other irrigation device. In applications where water is most dirty, a typical filter method is a stainless steel filter with a scrubber system. This scrubber system leverages off the movement of the diaphragm. When the valve opens, the fixed scrubber fingers slide across the moving filter and remove debris. In the case of an irrigation turbine/generator, there are also small clearances between the impeller and the surrounding housing. To ensure that the impeller continues to turn, in some embodiments, filtering is used to eliminate large (as determined based on clearances) debris from entering impeller section of the generator/turbine. While the filter prevents large debris from entering the impeller section, large amounts of debris can clog the filter. To resolve this, in some embodiments, a scrubber mechanism can aid in cleaning of the filter. And in some embodiments, since there is no moving diaphragm to leverage off of, other methods are used to produce this movement.

Figure 12:
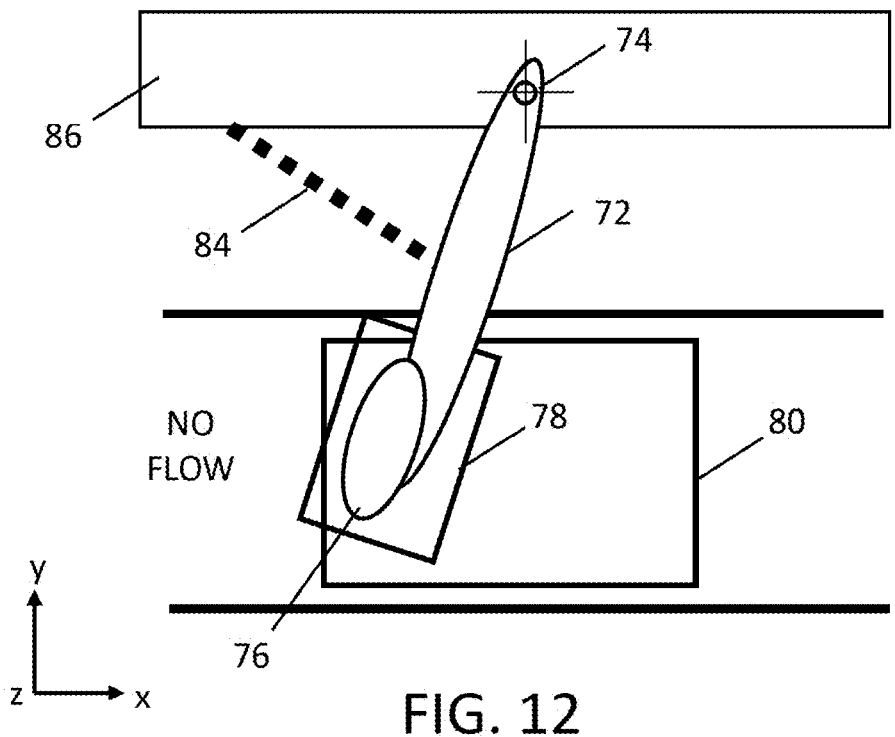
FIG. 12 illustrates a mechanism to automatically remove debris from a filter in a fluid flow path of a hydro-power generator system, the mechanism is illustrated with no or minimum fluid flow, in accordance with some embodiments.

FIG. 12 illustrates a mechanism to automatically remove debris from a filter in a fluid flow path of a hydro-power generator system, the mechanism is illustrated with no or minimum fluid flow, in accordance with some embodiments. In the illustrated embodiment, a filter cleaner includes a spring loaded arm 72 having a first portion that is fixed proximate to a location in a fluid flow path of the irrigation conduit containing a filter 80 such that fluid flow will pass through the filter 80 and debris may collect on a filter surface of the filter 80. In FIG. 12, the first portion is at a first end 74 of the arm 72, and the first end 74 is pivotally coupled to a housing 86. A second end of the arm is a movable portion of the arm 72 and which includes a collector portion 76 that at least partially extends into the flow path. The second end of the arm 72 also includes a scrubber element having a scrubber surface 78 that is configured and located to physically contact a portion of the surface of the filter 80. The scrubber surface is held against the filter 80. And an elastic member, e.g., a spring 84 or other elastic or resistance element, is attached to a portion of the movable portion (portion of the arm 72) and to another portion of a housing 86.

Figure 13:
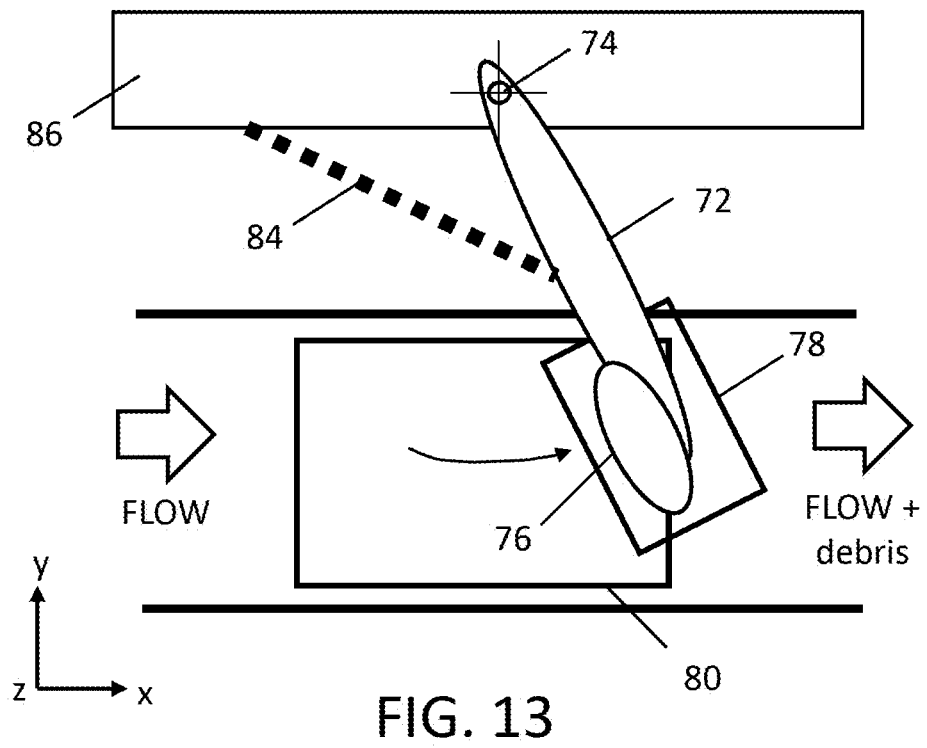
FIG. 13 illustrates the mechanism of FIG. 12 illustrated in the presence of fluid flow in accordance with some embodiments.
Figure 14:
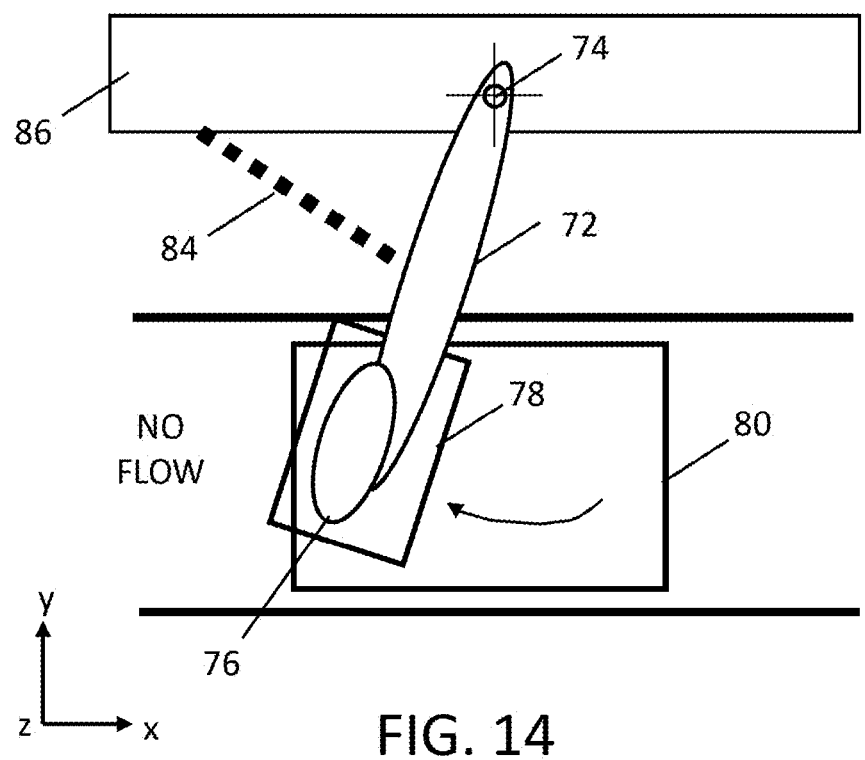
FIG. 14 illustrates the mechanism of FIGS. 12 and 13 illustrated again with no or minimum fluid flow in accordance with some embodiments.

When there is no flow (as shown in FIG. 12), the spring 84 pulls the arm 72 such that the scrubber surface 78 is at a leading edge or portion of the filter 80. When there is an increase in flow as shown in FIG. 13, the flow pushes against the collector portion 76 to overcome the resistance of the spring 84 and pivot the arm 72 about the first end 74. This causes the scrubber surface 78 to swing across a filter surface of the filter 80, rubbing the filter to clean the filter and remove any debris that is stuck to the filter surface of the filter 80. And then when there is a decrease in the flow or the flow stops (as shown in FIG. 14), the spring 84 pulls the movable portion of the arm 72 back to the starting position of FIG. 12, again causing the scrubber surface to rub against the filter surface of the filter 80. The result is an oscillating motion of the scrubber surface 78 of the scrubber element across the filter 80 to remove debris. The filter 80 is fixed in position and the scrubber surface 78 physically contacts and moves against the filter surface of the filter 80. According, in some embodiments, responsive to a change in flow of the fluid flow, the scrubber surface moves against the filter surface to provide a wiping motion across the filter surface. An increase in the flow will move the scrubber surface 78 in one direction across the filter surface, and a decrease in the flow will move the scrubber surface 78 in another direction across the filter surface. In some embodiments, the scrubber surface 78 moves across the filter surface in a linear pattern (e.g., a linear arc).

In some embodiments, the scrubber surface 78 of the scrubber element comprises an abrasive material. In some embodiment, the scrubber surface 78 should be made of a softer material than the filter 80 so that it can wear without damaging the filter 80 itself. The spring 84 attached to the arm 72 can also be used to provide a consistent normal force from the arm 72 to the spring 84 to ensure that the scrubber surface physically contacts the filter surface. In some embodiments, a second spring (not shown) can be used to provide this normal force. The spring(s) will also keep the force relatively constant as the arm wears.

It is noted that the shape and surface area of the collector portion 76 can be designed to provide enough surface area for the flow to push against without impeding the flow of the water through the conduit. The collector portion 76 can take a variety of forms, e.g., the collector portion 76 may be at least one of a scoop, paddle, and vane. It is noted that the x-y-z axes are shown for reference, to shown correspondence to the further embodiments of FIGS. 15-22. In these embodiments, the flow enters along the x axis, and a portion of which continues along the x-axis and another portion passes through the filter in the z-axis. This is shown better in the alternate orientations of FIGS. 15-17.

Figure 15:
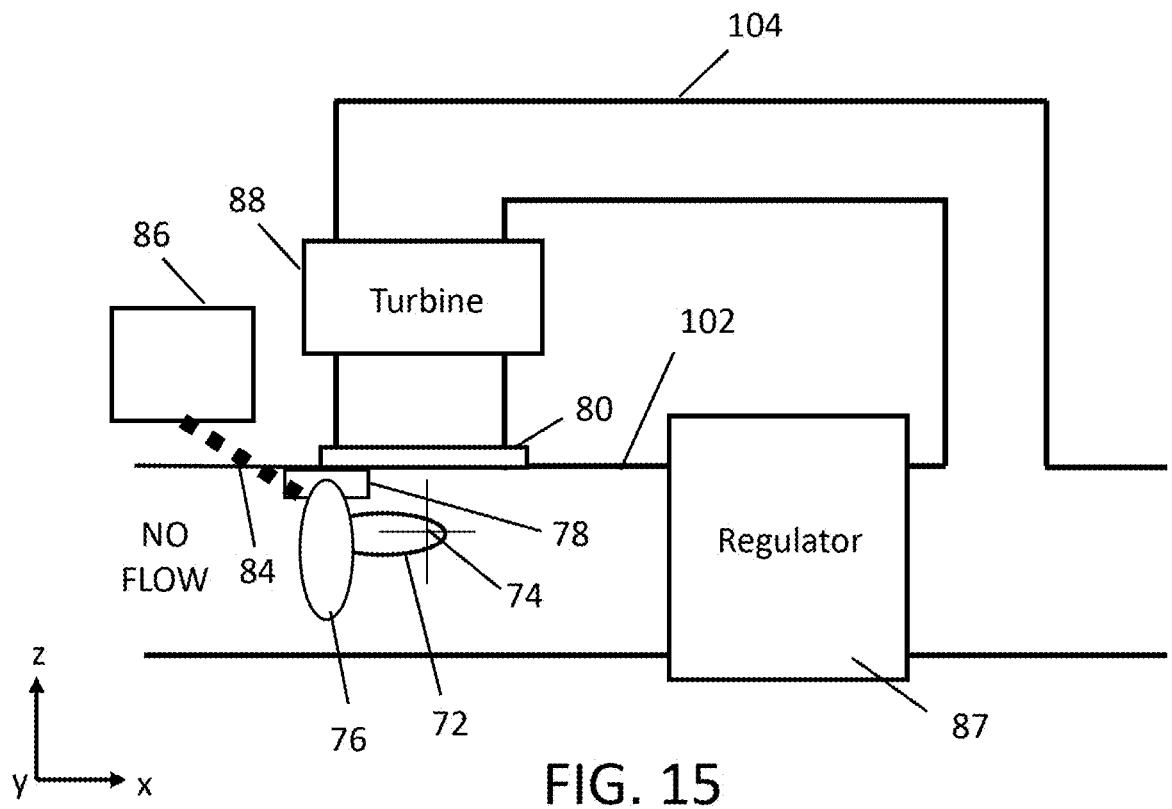
FIG. 15 illustrates some embodiments of a second orientation of the mechanism of FIG. 12, the mechanism illustrated with no or minimum fluid flow, in accordance with some embodiments.
Figure 16:
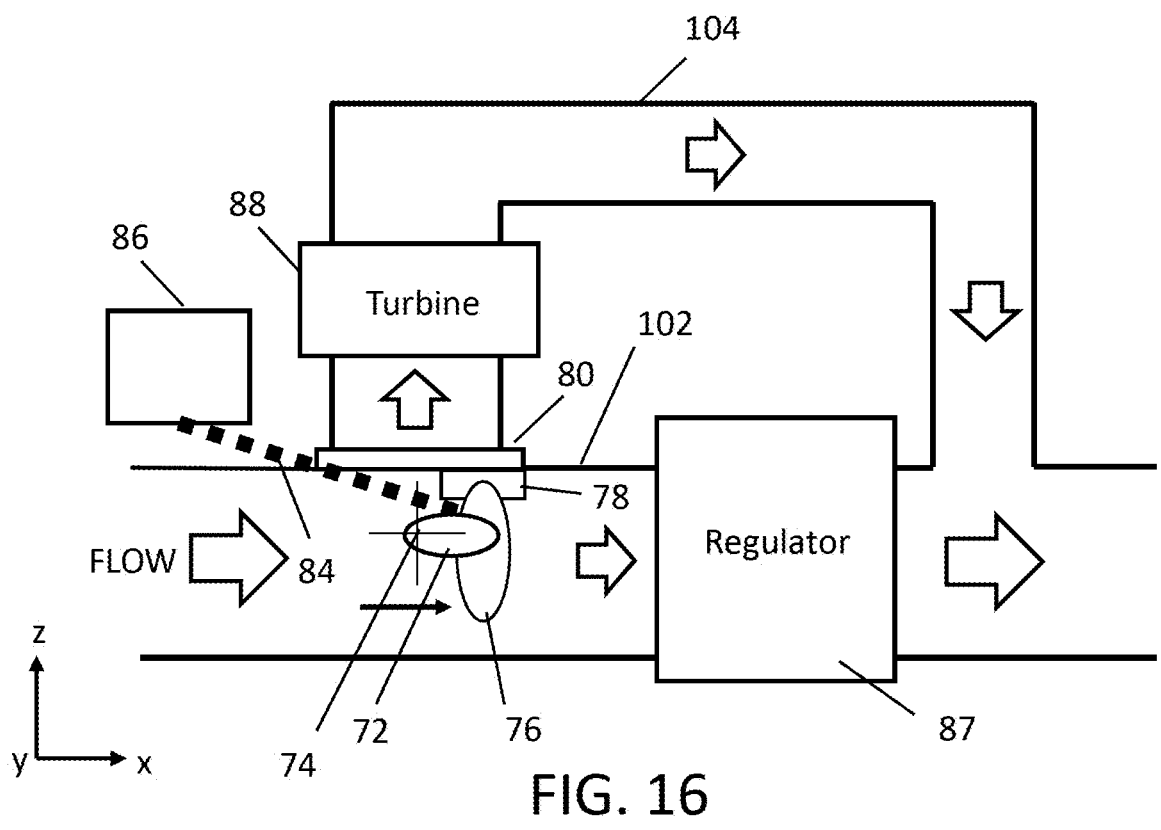
FIG. 16 illustrates the second orientation of the mechanism of FIG. 15 illustrated in the presence of fluid flow in accordance with some embodiments.
Figure 17:
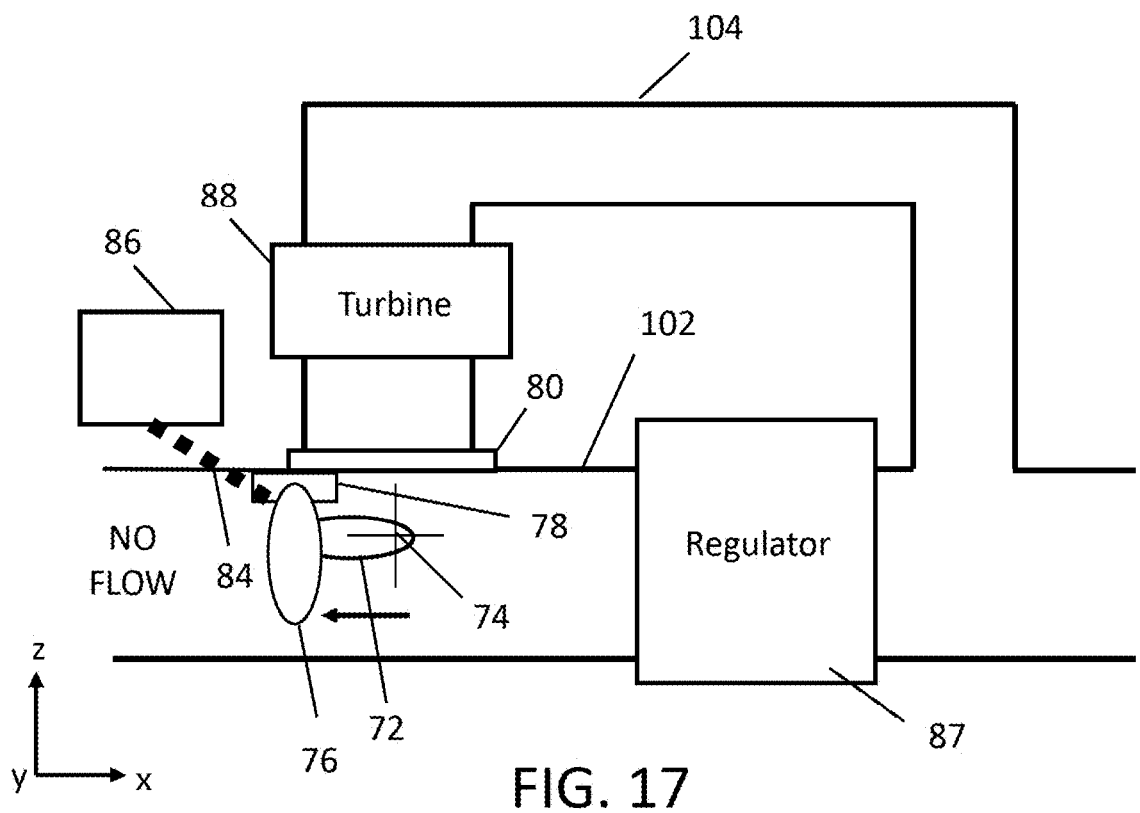
FIG. 17 illustrates the second orientation of the mechanism of FIGS. 15 and 16 illustrated again with no or minimum fluid flow in accordance with some embodiments.

For the orientation of FIGS. 15-17, a main flow path 102 of a main conduit and a bypass fluid flow path 104 of a bypass conduit (used for power generation) are shown. The main flow path 102 is formed from a main conduit that extends between a fluid input and a fluid output. And the bypass fluid flow path 104 is formed from a bypass conduit that extends from a first portion of the main conduit to a second portion of the main conduit.

In FIG. 15, there is no flow and the scrubber surface 78 of the scrubber element is positioned at the leading edge of the filter 80. When there is an increase in flow as shown in FIG. 16, the flow enters the main flow path 102 and the bypass flow path 104. In some embodiments, a regulator 87 in the main flow path 102 opens when there is sufficient flow/pressure from the flow at the regulator 87. When there is flow in the bypass flow path 104, a turbine 88 rotates causing the generator to generator (e.g., coil, magnets and electronics power). More details are provided in the patent documents incorporated herein by reference. In any event, an increase in the flow will push the collector portion 76 causing the scrubber surface 78 to sweep across the filter 80 to dislodge at least a portion of any debris (see FIG. 16). And then when the flow decreases or stops as shown in FIG. 17, the spring 84 pulls the scrubber surface 78 back across the filter surface of the filter 80. As is better shown in FIGS. 15-17, the spring 84 can be oriented to apply a force to pull the scrubber surface 78 toward the leading edge of the filter 80, but can also be oriented to apply a force normal to the filter 80 to effectively hold the scrubber surface 78 against the filter surface of the filter 80 as it sweeps back and forth. Thus, as shown, responsive to a change (increase/decrease) in flow of the fluid flow, the scrubber surface moves against the filter surface to provide a wiping motion across the filter surface.

Figure 18:
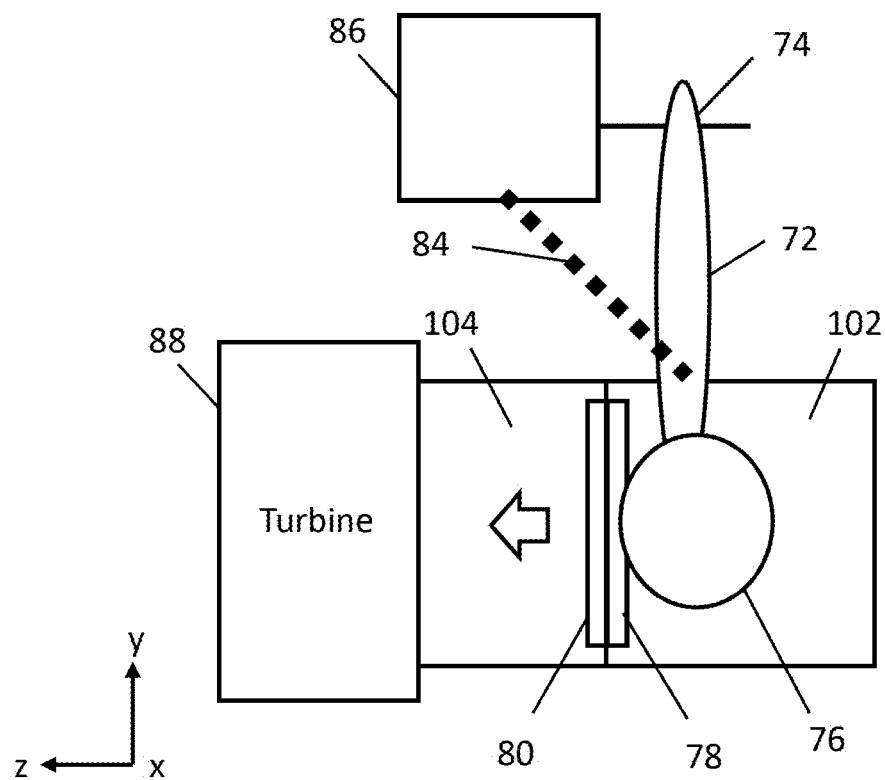
FIG. 18 illustrates some embodiments of a third orientation of the mechanism of FIGS. 11 and 14 in accordance with some embodiments.

FIG. 18 illustrates some embodiments of a third orientation of the mechanism of FIGS. 12 and 15 in accordance with some embodiments. That is, FIG. 18 shows a view of the collector portion 76 that sees/receives the incoming flow (the x-axis going into the view).

Figure 19:
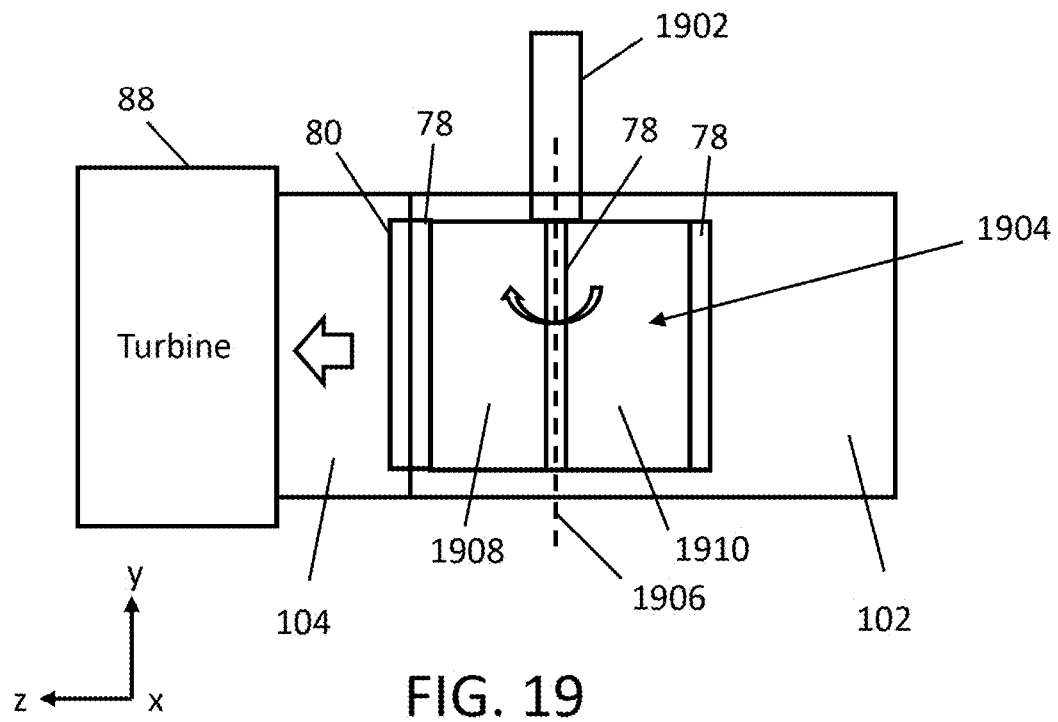
FIG. 19 illustrates a rotating mechanism to automatically remove debris from a filter in a fluid flow path of a hydro-power generator system in accordance with some embodiments.
Figure 20:
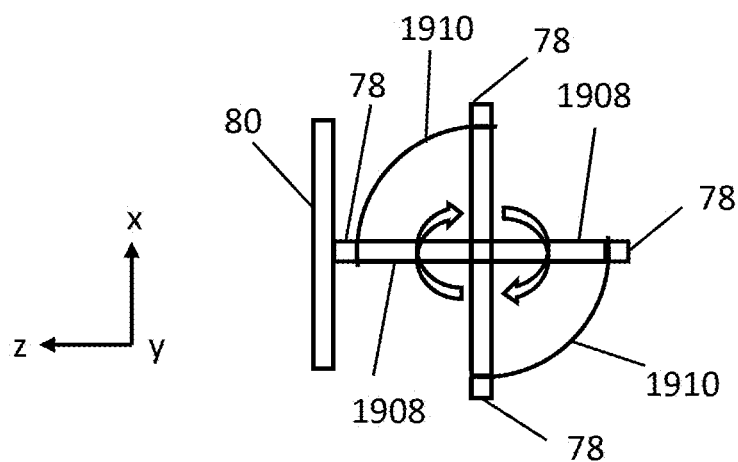
FIG. 20 illustrates another view of the rotating mechanism of FIG. 19 in accordance with some embodiments.

In other embodiments, as shown in FIGS. 19 and 20, an arm 1902 of the filter cleaner is fixed and a rotating collector portion 1904 rotates about axis 1906 due to flow against flat surface 1908 (instead of curved surface 1910). The edges of the collector portion 1904 have scrubber surface 78 material to rub against the filter surface of the filter 80 as it rotates. Again, the filter 80 is fixed, and the scrubber surface moves against the filter 80 based on changes in the flow. In these embodiments, the collector portion oscillates back and forth. With this motion, the movable portion rotates in the fluid flow and to cause the scrubber surface to impact the portion of the filter surface at each rotation of moveable portion. The surfaces 1908 and 1910 of the collection portion are exemplary and may be variously configured and contoured.

Figure 21:
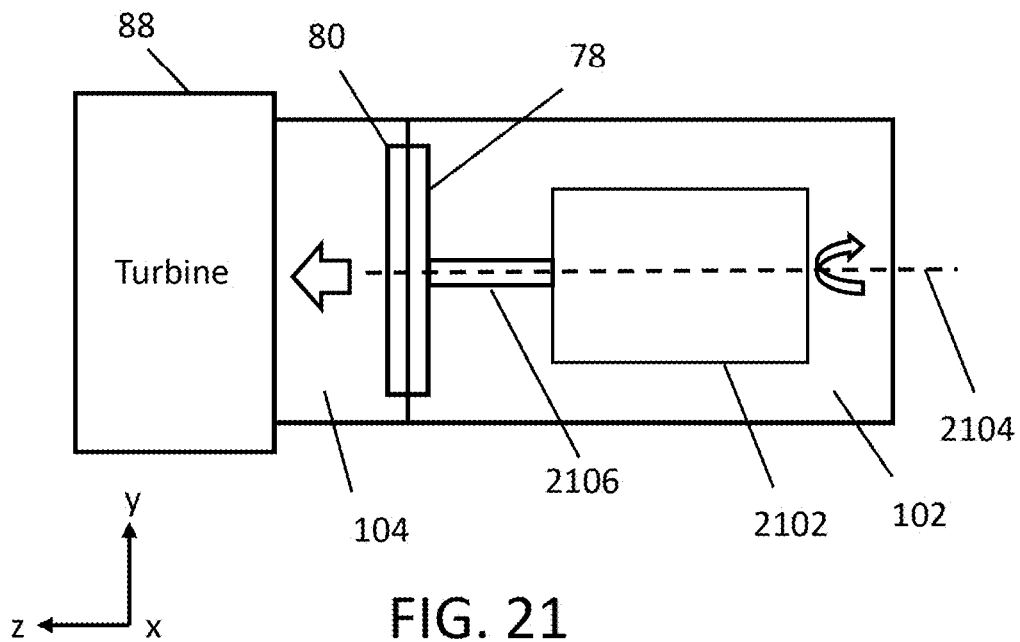
FIG. 21 illustrates a rotating mechanism to automatically remove debris from a filter in a fluid flow path of a hydro-power generator system in accordance with some embodiments.
Figure 22:
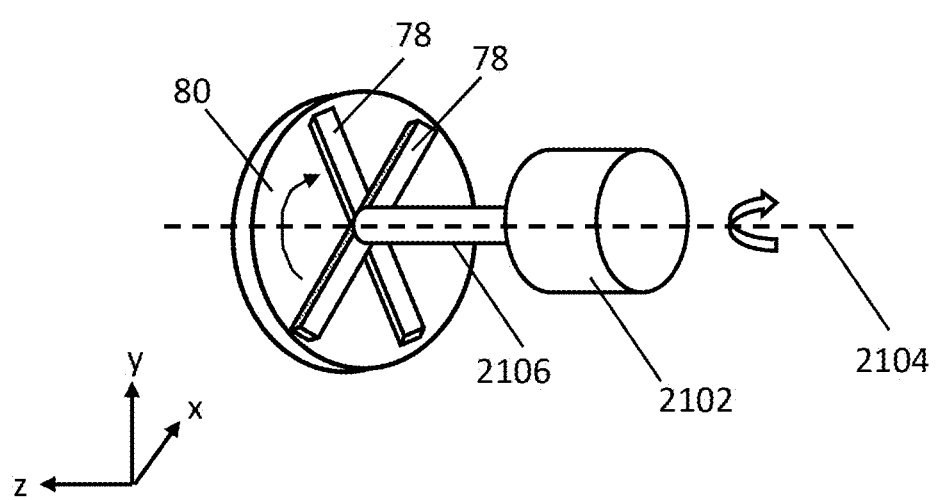
FIG. 22 illustrates a perspective view of the rotating mechanism of FIG. 21 in accordance with some embodiments.

FIGS. 21 and 22 illustrate a rotating mechanism to automatically remove debris from a filter in a fluid flow path of a hydro-power generator system in accordance with some embodiments. In these embodiments, the collector portion 2102 rotates about axis 2104 when water is flowing. The collector portion 2102 is rigidly fixed to the scrubber element such that the scrubber element and the scrubber surfaces 78 rotate with the collector portion 2102 and rub against the filter 80. The scrubber surfaces 78 are shaped to allow water flow through the filter 80 but still pass across the filter as it rotates. The shape of the collector portion 2102 can be altered as is known in paddle and/or vane designs to rotate. FIG. 22 is a perspective view of FIG. 21. Accordingly, in the illustrated embodiment, the movable portion is configured to cause the scrubber surface to rotate against the portion of the filter surface.

Figure 23:
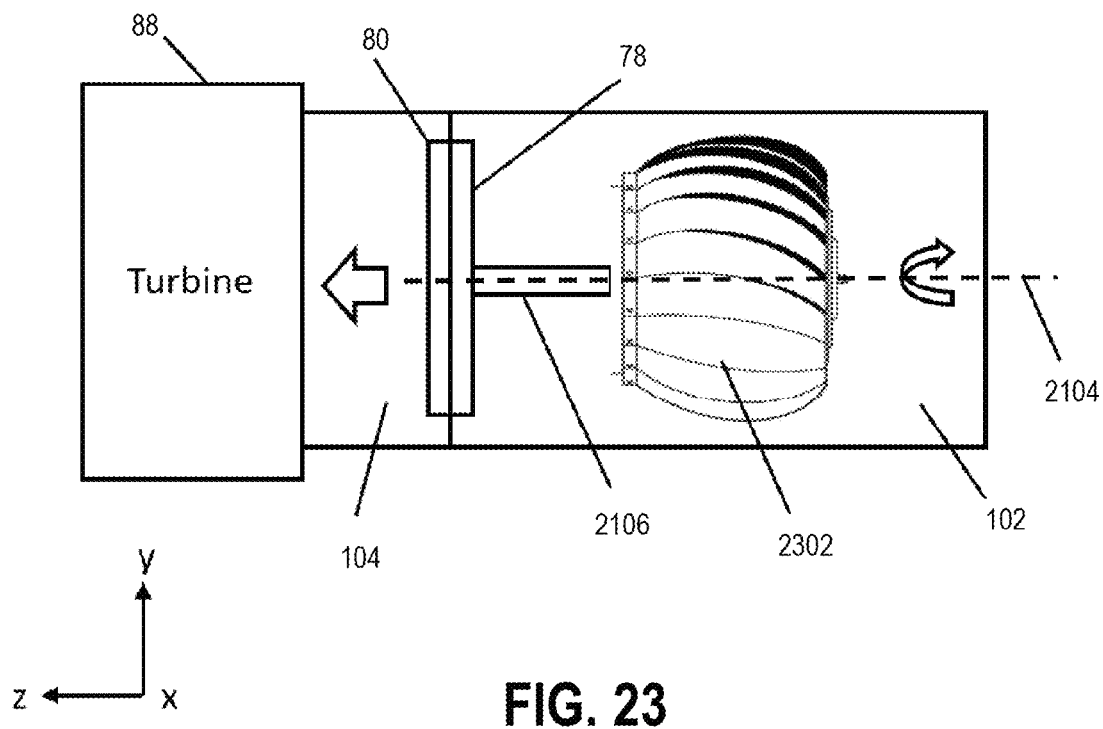
FIG. 23 illustrates a rotating mechanism to automatically remove debris from a filter in a fluid flow path of a hydro-power generator system in accordance with some embodiments.
Figure 24:
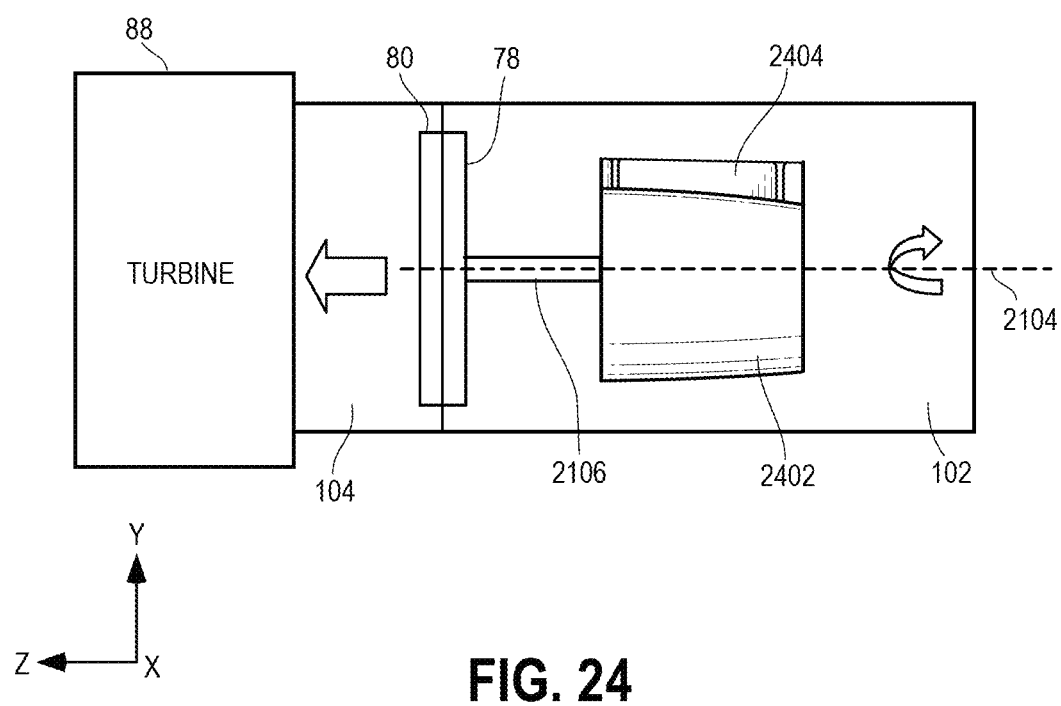
FIG. 24 illustrates a rotating mechanism to automatically remove debris from a filter in a fluid flow path of a hydro-power generator system in accordance with some embodiments.

FIGS. 23 and 24 illustrate various examples of rotating collector portions that typically rotate in one direction during water flow in accordance with some embodiments. In FIG. 23, the collector portion 2302 takes the form of a rotating vent or fan having curves vents to cause rotation in a single direction about axis 2104. And in FIG. 24, the collector portion 2402 takes the form of a cylindrical tube having large, curved vents 2404 on each side to cause rotation in one direction about axis 2104. This curvature can also cause a force on the shaft 2106 normal to the filter 80 such that the scrubber surface 78 is held against the filter surface of the filter 80 as it rotates.

Filter Health Monitor

Figure 25:
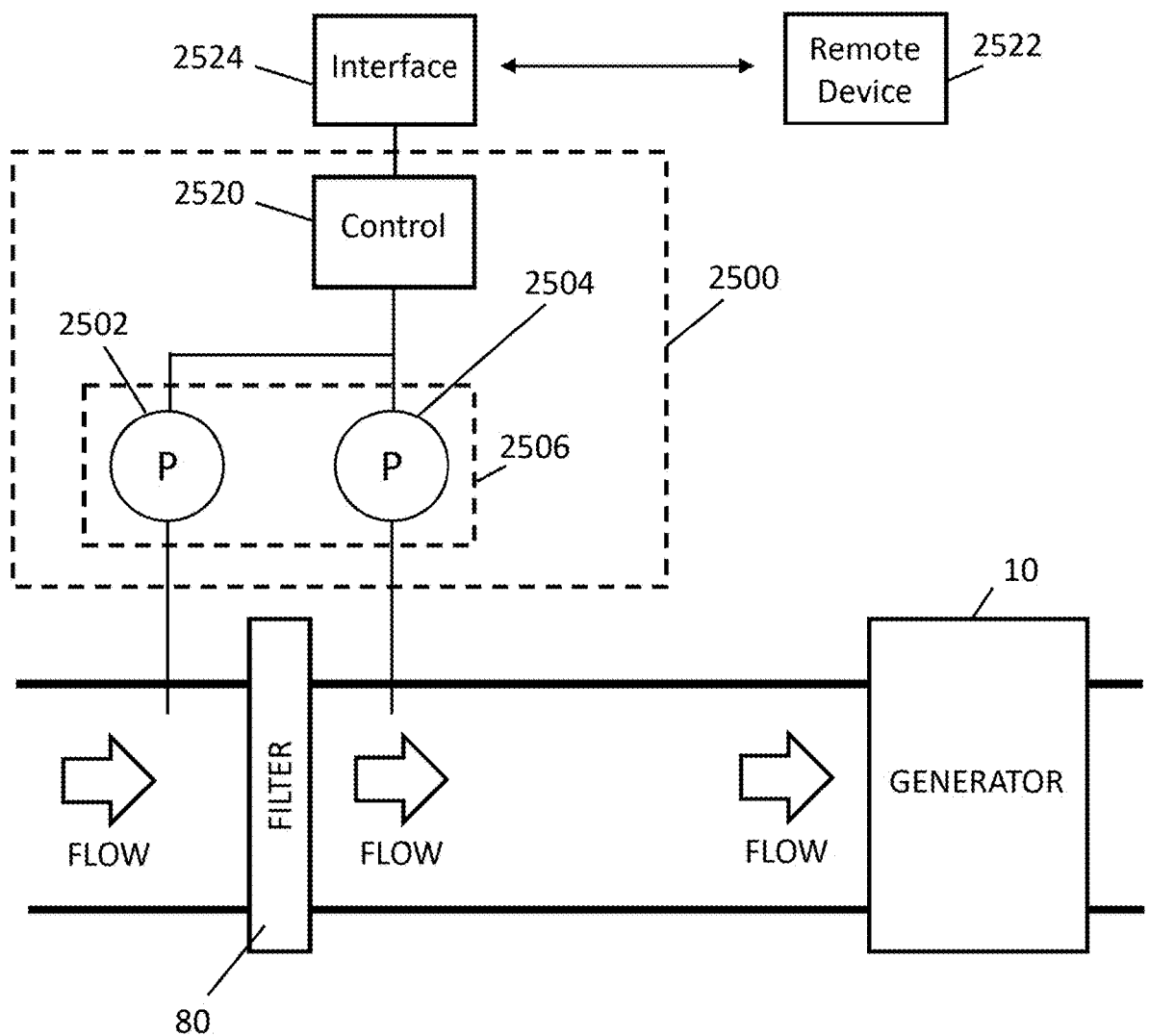
FIG. 25 illustrates a differential pressure sensor used to remotely monitor a health of an inline debris filter in a fluid flow path of a hydro-power generator system in accordance with some embodiments.
Figure 26:
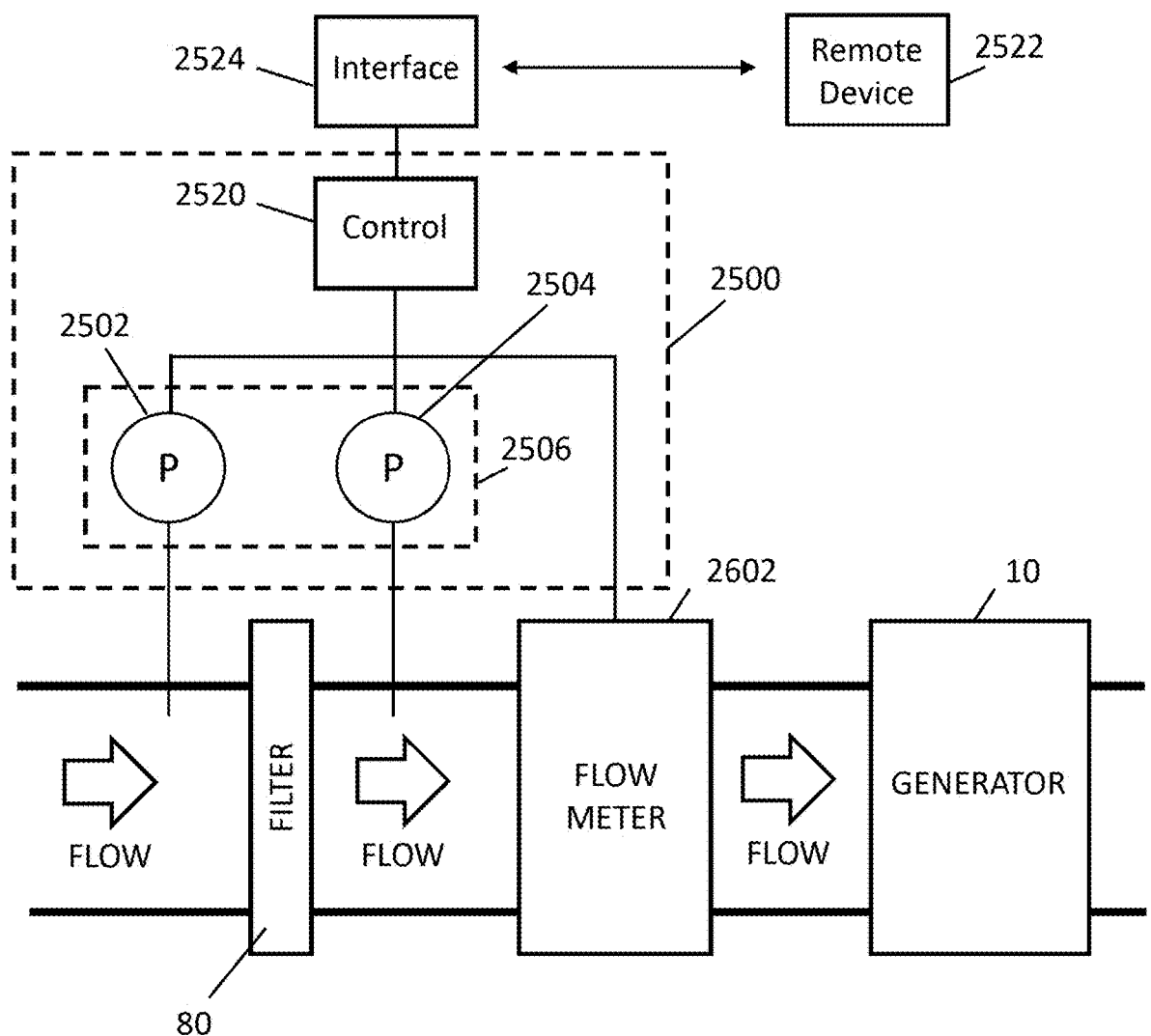
FIG. 26 illustrates a differential pressure sensor and a flow meter used to remotely monitor a health of an inline debris filter in a fluid flow path of a hydro-power generator system in accordance with some embodiments.

Referring to FIGS. 25-26, several embodiments are described that relate to the monitoring of the health of a debris filter in a hydro-power generator 10.

In some embodiments, a remote and real time method of determining filter health in an irrigation system is provided. In an irrigation system, a filter is used to catch debris and prevent it from clogging or damaging downstream components or systems. As the filter catches debris, this debris reduces flow through the filter. Since the filter could become clogged with debris in several months or several years, it would be beneficial to know the health of the filter without needing to visit the location. In embodiments that use hydro-power generators, in some cases, the turbines involved in power generation device can be very sensitive to grit/debris.

Several embodiments allow a user to see the health of a filter as often as is necessary; monthly, weekly, daily, hourly with the latest filter health being based on the last time it was run.

As shown in FIG. 25, a filter monitor circuit 2500 is used to remotely monitor a health of an inline debris filter 80 in a fluid flow path of a hydro-power generator 10 in accordance with some embodiments. The filter monitor circuit 2500 includes a first pressure sensor 2502 configured to be located proximate an upstream surface of a filter 80 located in a fluid flow path of the irrigation conduit such that fluid flow will pass through the filter 80 and debris may collect on a filter surface. The first pressure sensor 2502 is configured to output a first signal corresponding to a first pressure of the fluid flow proximate the upstream surface of the filter 80. The filter monitor circuit 2500 also includes a second pressure sensor 2504 configured to be located proximate a downstream surface of the filter 80 and to output a second signal corresponding to a second pressure of the fluid flow proximate the downstream surface of the filter 80. The filter monitor circuit 2500 also includes a control circuit 2520

(processor, microcontroller, circuit, etc.) coupled to the first pressure sensor 2502 and the second pressure sensor 2504 and configured to determine, based on the first signal and the second signal, a health of the filter. In some embodiments, the first pressure sensor 2502 and the second pressure sensor 2504 comprise a differential pressure sensor 2506. In some embodiments, the control circuit 2520 can output data to be transmitted to a remote device 2522 using an interface 2524 (wired or wireless interface). The data may include the signaling, data corresponding to the signaling, and/or pressure determinations based on the signal. For example, in some embodiments, the control circuit 2520 is configured to interface 2524 comprises a transceiver configured to transmit the indication of the health of the filter having been determined to the remote device 2522.

In some embodiments, a curve can be created for various levels of filter clogging so that a variable output can be provided. In some embodiments, a low-pressure differential means that the filter 80 is new; while a higher pressure differential indicates filter needs replacing. To the user, the breakdown can be output and shown as a value corresponding to the health of the filter (100% (new), 90%, . . . 50%, . . . Time to replace). While differential pressure sensing can be an effective method for determining filter health (pressure drop across the filter), it may be less reliable if the flow rate through the filter 80 is variable. For example, if a simple differential pressure system was set for 3 psi for a maximum value of flow restriction, this may work well at higher flow rates, but would be excessive at low flow rates systems. Similar to pressure loss values for a valve, the pressure loss changes significantly over the flow rate range. For example, 5 psi pressure loss is fine at 20 GPM, but excessive at 5 GPM.

However, for normal irrigation applications, the flow rate can change based on available water pressure as well as type of water disbursement (rotor, spray, drip). In some embodiments, both the flow rate and the differential pressure are determined. In this case, the differential pressure would need to be characterized for various flow rates, so filter health could be determined for known flow rates as well as interpolated all other flow rates. Again, the output could be simple (Filter: Good/Filter: Bad) or could be more complex (100% (new), 90%, . . . 50%, . . . Time to replace) allowing the user to potentially predict when the filter 80 needs replacing. For example, while a given pressure differential may correspond to the filter 80 being clogged at one flow rate, the same pressure differential may not correspond to the filter 80 being clogged at a different flow rate. Thus, knowledge of the flow rate together with the differential pressure measurements will ensure that the proper pressure curve is used.

Such embodiments are illustrated in FIG. 26. A curve would be developed for each of several different flow rates. In the embodiments of FIG. 26, pressure data from the first pressure sensor 2502, the second pressure sensor 2504, and a flow rate signal corresponding to a flow rate of the fluid flow are provided to the control circuit 2520. In some embodiments, the flow rate signal is provided by and received from a flow rate sensor (e.g., flow meter 2602). In some embodiments, the flow rate signal is obtained at a time corresponding to the signals from the pressure sensors. Either the control circuit 2520 or the remote device 2522 will use the flow rate data together with the pressure data to determine the health of the filter 80.

In the embodiments of FIGS. 25 and 26, the interface 2524 could provide a wireless interface to the remote device 2522. For example, the interface 2524 could be battery operated and then send a wireless signal (Bluetooth, LoRa, . . . ) to the remote device 2522 (e.g., controller, server, handheld phone/tablet). Since filter status would likely change very slowly, LoRa transmissions daily or weekly could be very efficient and use very little battery power in some embodiments. Additionally, if the remote device 2522 or the control circuit 2520 determines that filter 80 replacement is needed, the remote device 2522 could send a notification to the user to replace the filter 80.

Impeller Example

Figure 27:
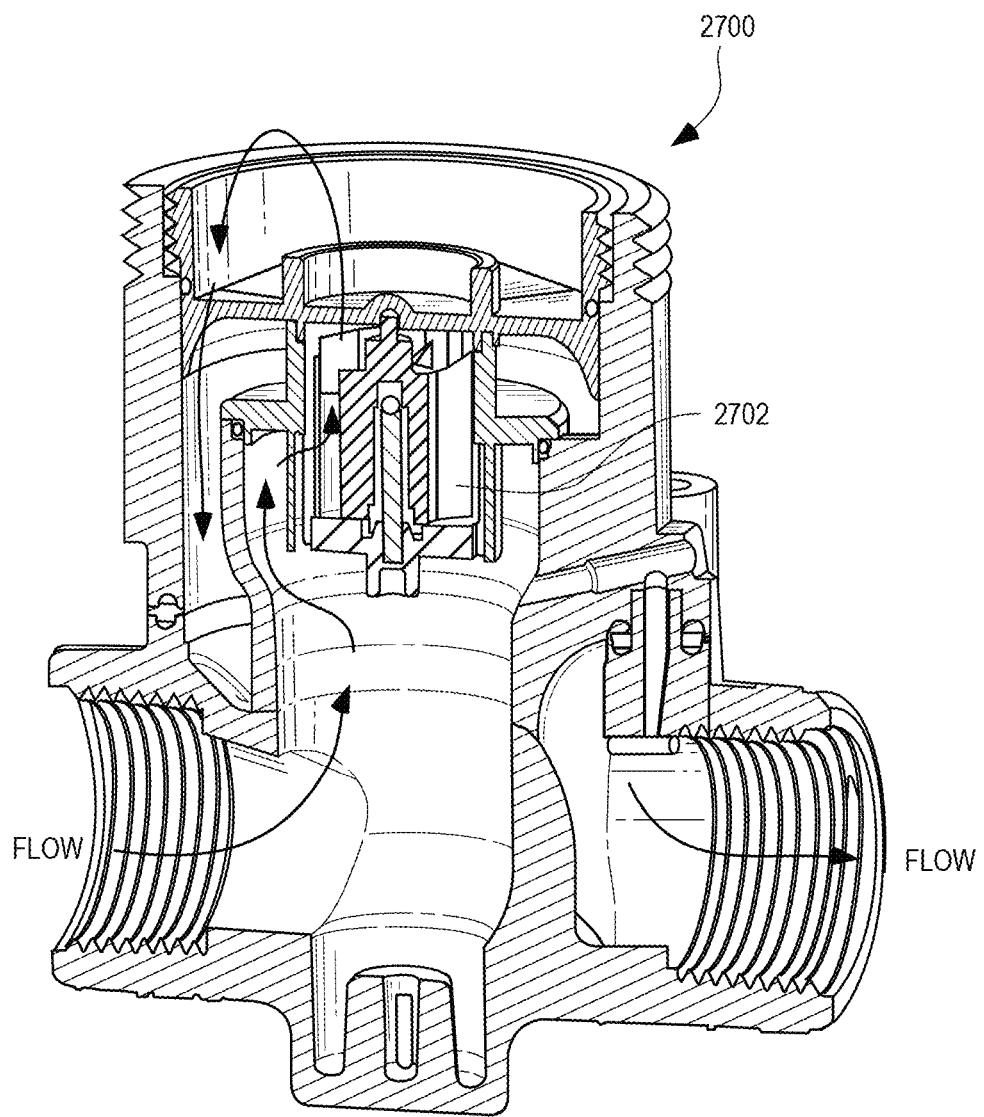
FIG. 27 illustrates a multi-jet impeller or turbine of a hydro-power generator in accordance with some embodiments.
Figure 28:
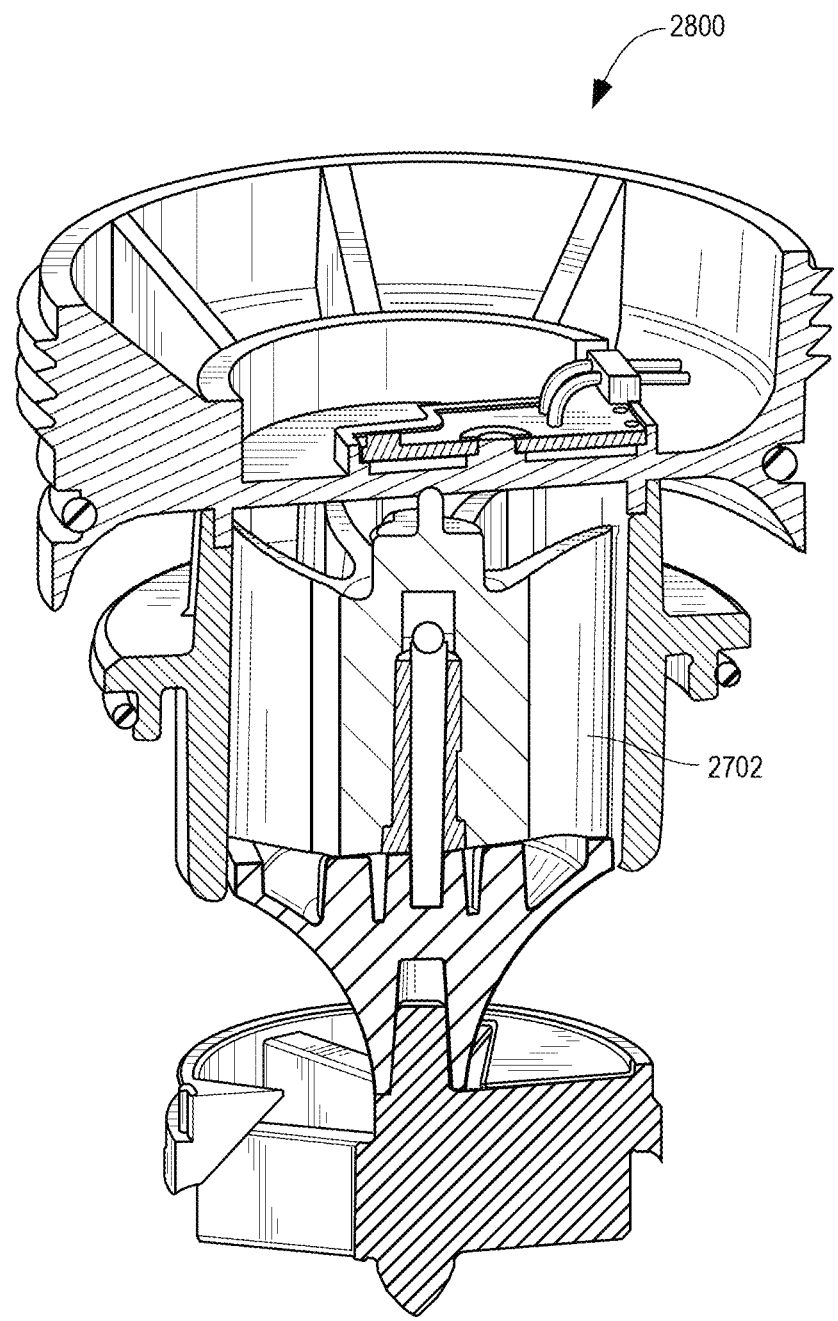
FIG. 28 illustrates a flow straightener and multi-window impeller including rare earth magnets for a hydro-power generator in accordance with some embodiments.

Referring to FIGS. 27-28, several embodiments are described that relate to a multi-jet impeller or turbine design for the hydro-power generator and further including protection from overvoltage and/or overspeed conditions.

FIG. 27 illustrates a multi-jet impeller or turbine 2700 of a hydro-power generator in accordance with some embodiments. And FIG. 28 illustrates a flow straightener and multi-window impeller 2800 including rare earth magnets for a hydro-power generator in accordance with some embodiments. Referring to FIGS. 27-28, an exemplary multi-jet water meter that was developed in the first quarter of 2010 intended to be retrofit to a Rain Bird PEB-100 lower valve body. The design of the impeller drive utilizes a combination of axial and radial (but not exclusive to this design concept, meaning it could be exclusively axial or parallel) flow harvesting of the velocity of the water flow in order to generate rotational motion of the custom contoured multi-blade impeller 2702 that is equipped with two opposite pole rare earth magnets. These magnets can induce an electrical signal in an energy harvesting chip that is mounted above the magnets or a shaft can be configured within the impeller in order to drive an electrical motor, single or multi-phase, depending on the power required in the application. As an example, but not a limitation in scope for this design concept, a multi-pole, single phase DC generator can have the opposite end of the shaft coming from the impeller assembly attach to the rotor of the generator in order to drive the rotor and generate an AC based varying voltage amplitude signal. This signal can be made into a DC voltage based signal using a diode based AC-DC rectifier circuit. The alternator would utilize slip rings similar to a Salient Pole Motor design for longevity with multiple poles to operate at lower RPM. Excessive speed control is achieved using a Zener diode wired in parallel with the field windings, but oriented in the reverse biased direction with a break-down voltage that is slighlty above, approximately 10%, of the maximum normal operating voltage of the generator. As the speed increases on the rotor, the voltage will increase until the point the Zener diode reverse biased voltage is exceeded. Once this voltage level is exceeded the diode will open and effectively shunt the circuit to ground thus increasing the current in the field windings, concurrently increasing the field flux, $\phi$ which subsequently decreases the speed of the motor. The voltage drop across the Zener diode will be somewhere between 0.5V and 1.0V. This is the maximum extent of the voltage drop, regardless of the current that goes through the Zener diode, which is a benefit for heat management, unlike the scenario of a series resistor being utilized in the circuit.

The principal of motor speed control is driven out of the supply voltage, back EMF and the current/resistance of the armature core. The speed of a DC based motor is given by:

$$N, \text{motor speed} = K(V - I_a R_a)/\phi,$$

where $K$ is a constant

From this equation the following can be implied and used for speed control within an electric motor/generator. (1) The speed of the motor is directly proportional to supply voltage. Therefore as the supply voltage is increased, so will the speed of the motor. (2) And, the speed of the motor is inversely proportional to the flux due to the field windings. As field winding flux is increased the motor speed will be reduced. This is the principal of this motor speed control.

Figure 29:
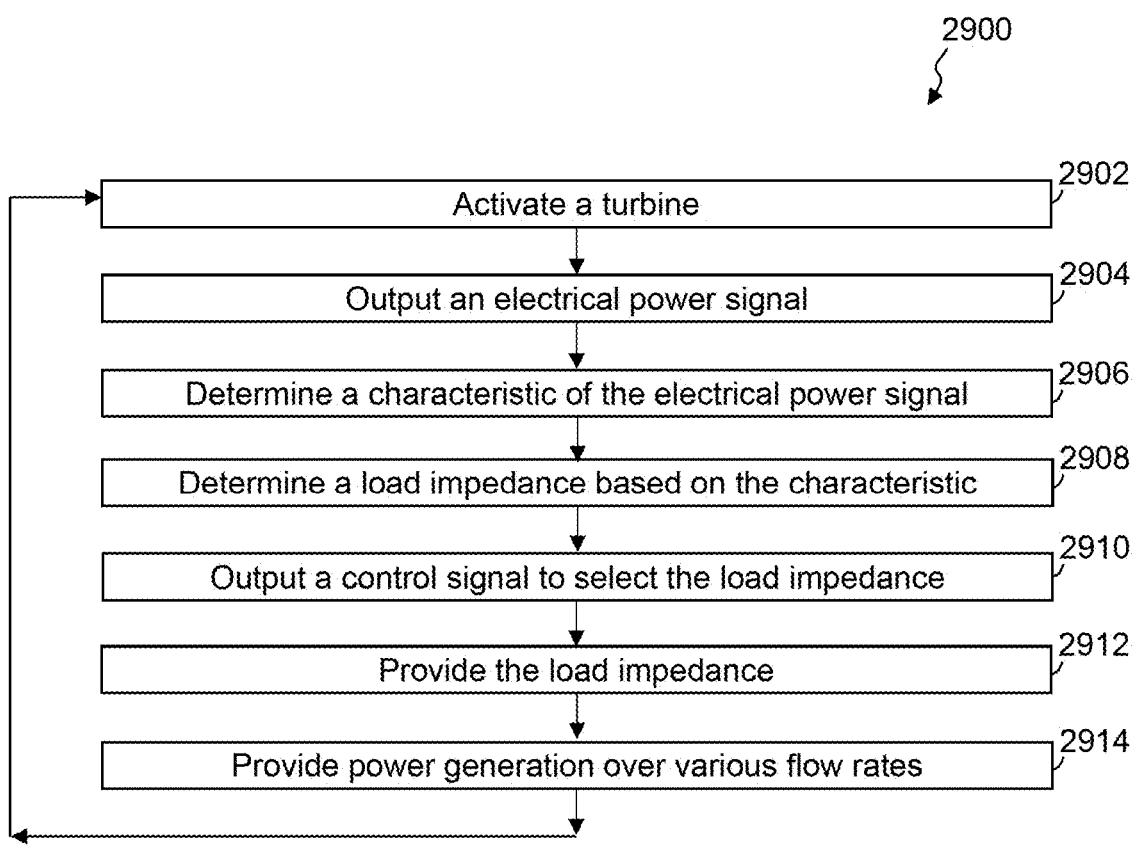
FIG. 29 illustrates a simplified flow diagram of an exemplary process of generating electrical power for an irrigation system, in accordance with some embodiments.

FIG. 29 illustrates a simplified flow diagram of an exemplary process 2900 of hydro-power generation for an irrigation system, in accordance with some embodiments. In step 2902, a turbine of a generator 10 is activate through a fluid flow in a conduit of an irrigation system. The turbine can be at least partially inserted into a fluid flow path of the conduit. In step 2904, an electrical power signal is outputted using the generator in response to the activation of the turbine. In step 2906, one or more characteristics of the electrical power signal are determined and/or sensed. In step 2908, a load impedance, selected from a plurality of load impedances, is determined based on one or more of the determined characteristics of the electrical power signal. In step 2910, a control signal is outputted to select the load impedance. In step 2912, the load impedance is provided by a variable load circuit based on the control signal, with the impedance of the variable load circuit being based on the characteristic. In step 2914, power is generated over various flow rates of fluid in the fluid flow path of the conduit of the irrigation system while the variable impedance of the variable load circuit is applied. The process 2900, in accordance with some embodiments, can be accomplished by any one of or a combination of two or more of the above systems described herein, such as the systems of FIGS. 1-5.

Figure 30:
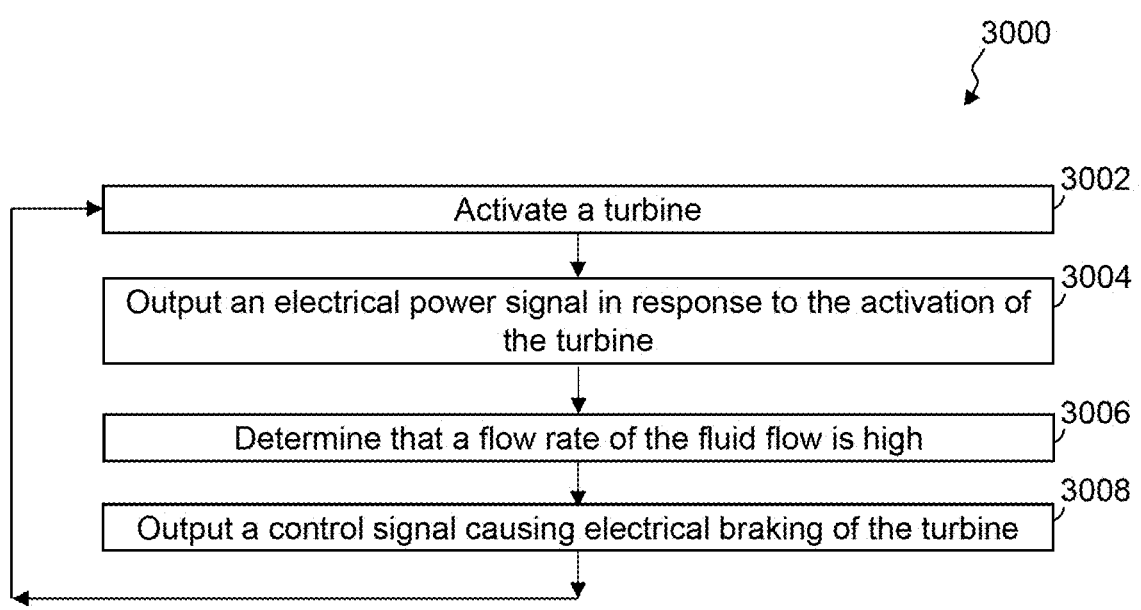
FIG. 30 illustrates a simplified flow diagram of an exemplary process of actively controlling speed for a hydro-power generation system of an irrigation system, in accordance with some embodiments.

FIG. 30 illustrates a simplified flow diagram of an exemplary process 3000 of electronic speed control of a hydro-power generation system of an irrigation system, in accordance with some embodiments. In step 3002, a turbine of a generator is activated through a fluid flow in a conduit of the irrigation system. The generator can comprise a rotor, a first coil surrounding at least a portion of the rotor, and the turbine. The turbine can be at least partially inserted into a fluid flow path of the conduit. In step 3004, an electrical power signal is outputted using the generator in response to the activation of the turbine. In step 3006, is can be determined, based on the electrical power signal, that a flow rate of the fluid flow and/or rotation of the turbine is too high. In step 3008, a control signal can be outputted causing electrical braking of the turbine. The process 3000, in accordance with some embodiments, can be accomplished by any one of or a combination of two or more of the systems described herein, such as the systems of FIGS. 6-8, 10-11B.

Figure 31:
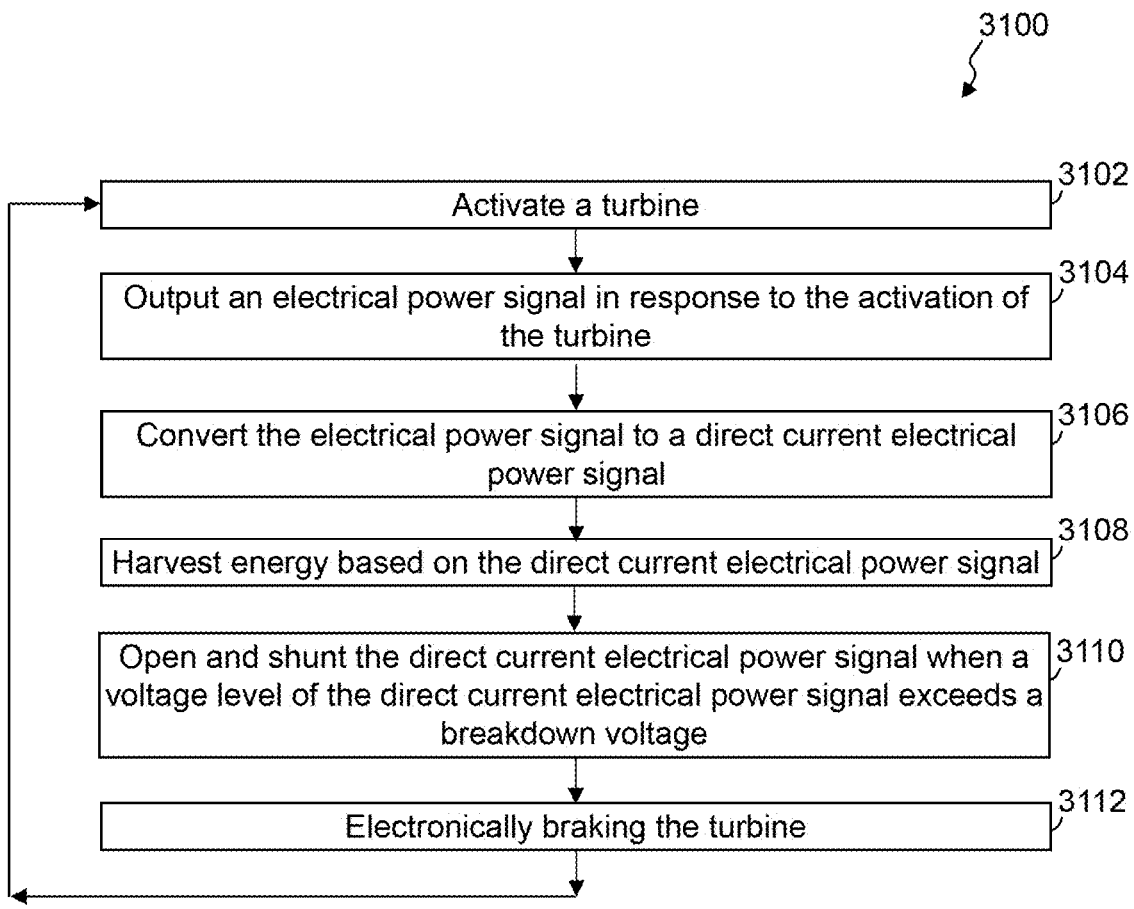
FIG. 31 illustrates a simplified flow diagram of an exemplary process of passively controlling speed for a hydro-power generation system of an irrigation system, in accordance with some embodiments.

FIG. 31 illustrates a simplified flow diagram of an exemplary process 3100 of providing overvoltage protection for a hydro-power generation system of an irrigation system, in accordance with some embodiments. In step 3102, a turbine of a generator is activated through a fluid flow in a conduit of the irrigation system. The turbine can be at least partially inserted into a fluid flow path of the conduit. In step 3104, an electrical power signal is outputted using the generator in response to the activation of the turbine. In step 3106, the electrical power signal is converted to a direct current electrical power signal. In step 3108, energy is harvested using an energy harvesting circuit based on the direct current electrical power signal. In step 3110, the direct current electrical power signal is opened and shunted to ground when a voltage level of the direct current electrical power signal exceeds a breakdown voltage of a diode. In step 3112, an electronic braking of the turbine is implemented based on the shunting of the direct current electrical power signal. The process 3100, in accordance with some embodiments, can be accomplished by one of or a combination of the above systems described herein, such as the systems of FIGS. 9-10.

Figure 32:
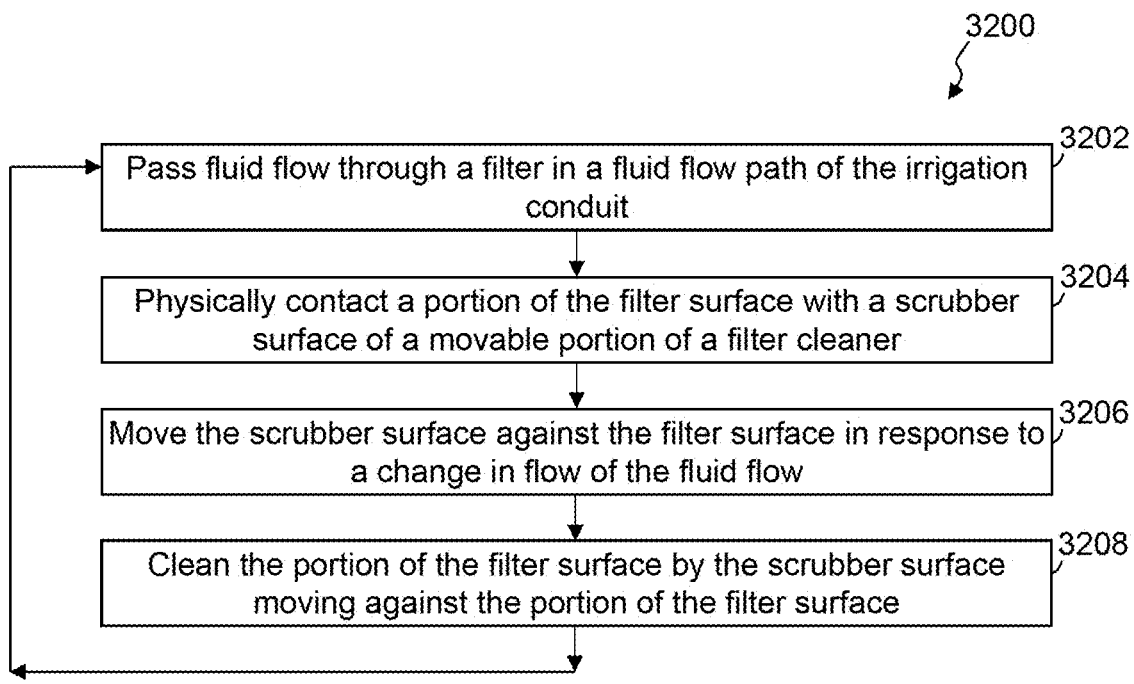
FIG. 32 illustrates a simplified flow diagram of an exemplary process of removing debris from a filter in an irrigation conduit, in accordance with some embodiments.

FIG. 32 illustrates a simplified flow diagram of an exemplary process 3200 of cleaning filter debris of a filter in an irrigation conduit, in accordance with some embodiments. In step 3202, a fluid flow is passed through a filter in a fluid flow path of the irrigation conduit such that debris may collect on a filter surface of the filter. In step 3204, a portion of the filter surface is physically contacted with a scrubber surface of a movable portion of a filter cleaner. The filter cleaner can, in some embodiments, comprise a first portion fixed proximate to a location in the fluid flow path of the irrigation conduit containing the filter. In step 3206, the scrubber surface is moved against the filter surface in response to a change in flow of the fluid flow. In step 3208, the portion of the filter surface is cleaned by the scrubber surface based on the change in the flow causing the scrubber surface to move against the portion of the filter surface. The process 3200, in accordance with some embodiments, can be accomplished by any one of or a combination of two or more of the above systems described herein, such as the systems of FIGS. 12-24.

Figure 33:
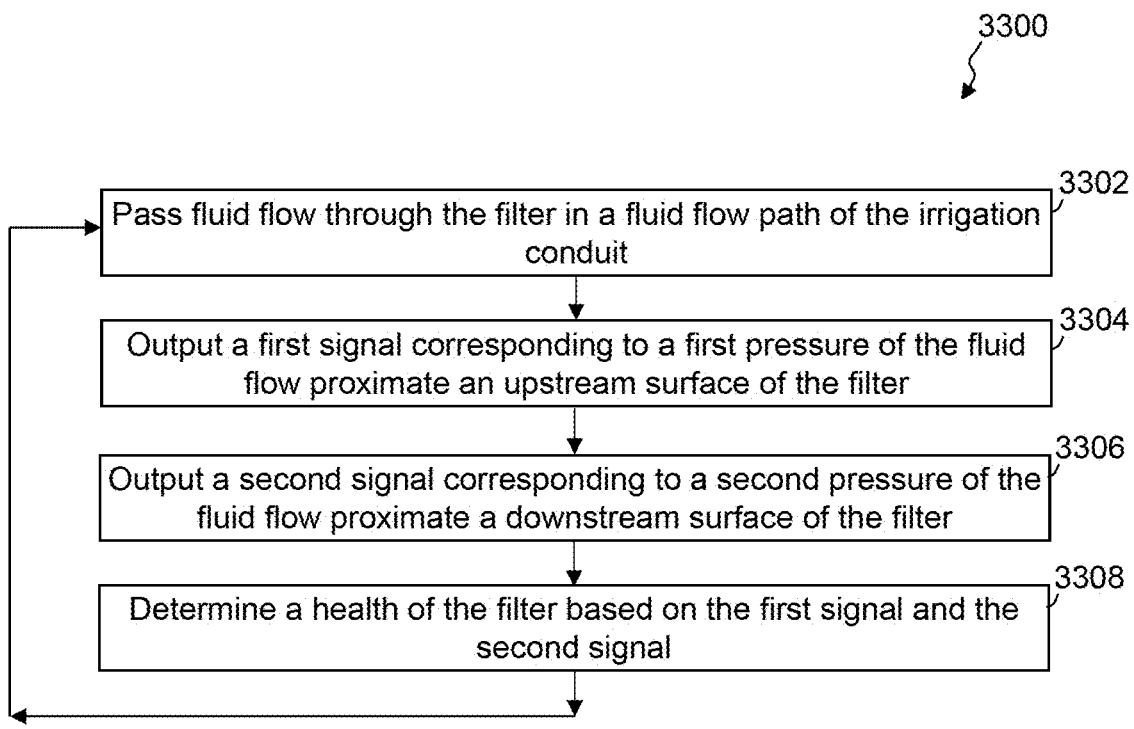
FIG. 33 illustrates a simplified flow diagram of an exemplary process of monitoring a filter health of a filter in an irrigation conduit, in accordance with some embodiments.

FIG. 33 illustrates a simplified flow diagram of an exemplary process 3300 of monitoring a health of a filter in an irrigation conduit, in accordance with some embodiments. In step 3302, a fluid flow is passed through the filter in a fluid flow path of the irrigation conduit such that debris may collect on a filter surface of the filter. In step 3304, a first signal is outputted, by a first pressure sensor of a filter monitor circuit, corresponding to a first pressure of the fluid flow proximate an upstream surface of the filter. The first pressure sensor can be located proximate the upstream surface of the filter. In step 3306, a second signal is outputted, by a second pressure sensor of a filter monitor circuit, corresponding to a second pressure of the fluid flow proximate a downstream surface of the filter. The second pressure sensor can be located proximate the downstream surface of the filter. In step 3308, a health of the filter is determined, by a control circuit coupled to the first pressure sensor and the second pressure sensor, based on the first signal and the second signal. The process 3300, in accordance with some embodiments, can be accomplished by one of or a combination of the above systems described herein, such as the systems of FIGS. 25-26.

Some embodiments provide hydro-power generation systems for an irrigation system. Such hydro-powered generation system can comprise: a generator comprising a turbine at least partially inserted into a fluid flow path of a conduit of the irrigation system and configured to be activated by a fluid flow in the conduit, wherein the generator is configured to output an electrical power signal in response to the activation of the turbine; a control circuit coupled to the generator, wherein the control circuit is configured to: determine a characteristic of the electrical power signal; determine, based on the characteristic, a load impedance selected from a plurality of load impedances; and output a control signal to select the load impedance; and a variable load circuit coupled to the control circuit and configured to: receive the control signal; and provide the load impedance based on the control signal; wherein an impedance of the variable load circuit is based on the characteristic to provide power generation over various flow rates of fluid in the fluid flow path of the conduit of the irrigation system.

The characteristic, in some embodiments, comprises a frequency of the electrical power signal. The control circuit can be configured to determine the frequency of the electrical power signal as a function of a timing of pulses of the electrical power signal. The frequency of the electrical power signal can correspond to one or both of a speed of the turbine and a flow rate of the fluid flow at the turbine. The value of at least one of the plurality of load impedances varies over time. A value of at least one of the plurality of load impedances, in some embodiments, is substantially constant. The variable load circuit, in some embodiments, comprises: a load having a nominal load impedance; a switch coupled to the control circuit; and a supplemental load comprising one or more additional loads coupled to the switch, wherein the control signal controls the switch to selectively couple and decouple at least one of the one or more additional loads to provide the load impedance selected from the plurality of load impedances. The one or more additional loads can comprise one or more resistors coupled in series with the load. In some embodiments, the switch comprises a separate switch coupled to the control circuit for each of the one or more additional loads.

In some embodiments, the variable load circuit comprises: a load having a nominal load impedance; and a switch coupled to the load and to the control circuit, wherein the control circuit outputs the control signal to selectively control a duty cycle of the switch switching between a closed state and an open state that controls the selective coupling and decoupling of the load to the generator to provide the load impedance selected from the plurality of load impedances. The switch, in some implementations, can comprise a transistor. Additionally or alternatively, in some embodiments, the variable load circuit comprises: a rectifier circuit coupled to the generator to convert the electrical power signal to a direct current electrical power signal to be applied to a load, wherein the rectifier circuit comprises a switch coupled in series in a path of the rectifier circuit; wherein the control circuit outputs the control signal to selectively control a duty cycle of the switch switching between a closed state and an open state that controls the selective coupling and decoupling of current from the path of the rectifier circuit to provide the load impedance selected from the plurality of load impedances. The rectifier circuit can comprise a diode bridge rectifier that includes a positive diode path and a negative diode path, wherein the switch is coupled in series with one of the positive diode path and the negative diode path. In some embodiments, the switch comprises a transistor. A rectifier circuit can be included, in some embodiments, that couples to the generator to convert the electrical power signal to a direct current electrical power signal to be applied to a load. The variable load circuit, in some embodiments, comprises a load having a nominal load impedance, wherein the load comprises an energy harvesting circuit. The variable load circuit can comprise a load having a nominal load impedance, wherein the load comprises a charging circuit for a power storage device. Some embodiments further comprise a power storage device coupled with the generator and configured to receive the electrical power signal and store electrical energy based on the electrical power signal. In some embodiments, the hydro-power generation system further comprises an irrigation device coupled to a power storage device, where the irrigation device can be configured to receive operational power from the power storage device. The irrigation device can comprises one or more of: an irrigation controller, a solenoid, an actuator, and a sensor. The hydro-powered generation system, in some embodiments further comprise a wireless transceiver irrigation control device coupled to power storage device and configured to receive operational power from the power storage device.

Some embodiments provide methods of hydro-power generation for an irrigation system, comprising: activating, through a fluid flow in a conduit of an irrigation system, a turbine of a generator, wherein the turbine is at least partially inserted into a fluid flow path of the conduit; outputting, using a generator, an electrical power signal in response to the activation of the turbine; determining a characteristic of the electrical power signal; determining, based on the characteristic, a load impedance selected from a plurality of load impedances; and outputting a control signal to select the load impedance; and providing, by a variable load circuit, the load impedance based on the control signal; wherein an impedance of the variable load circuit is based on the characteristic to provide power generation over various flow rates of fluid in the fluid flow path of the conduit of the irrigation system.

Some embodiments provide electronic speed control systems for hydro-power generation systems of irrigation systems. These electronic speed control system can comprise: a generator comprising: a rotor; a first coil surrounding at least a portion of the rotor; and a turbine coupled to the rotor and at least partially inserted into a fluid flow path of a conduit of the irrigation system and configured to be activated by a fluid flow in the conduit, wherein the first coil of the generator is configured to output an electrical power signal in response to the activation of the turbine and rotation of the rotor; and a control circuit configured to: determine, based on the electrical power signal, that a flow rate of the fluid flow is too high; and output a control signal to cause electrical braking of the turbine. In some embodiments, the control circuit is configured determine that the flow rate of the fluid flow is too high by being configured to: determine a characteristic of the electrical power signal; determine that the characteristic of the electrical power signal has exceeded a threshold for the characteristic. The characteristic can comprise, in some implementations, a frequency of the electrical power signal and wherein the threshold comprises a frequency threshold. The control circuit can be configured to determine the frequency of the electrical power signal as a function of a timing of pulses of the electrical power signal.

In some embodiments, the electronic speed control systems further comprise: a second coil surrounding at least another portion of the rotor; and a switch coupled to the control circuit and the second coil; wherein the control circuit is configured to output the control signal to the switch to short the second coil to cause the electrical braking of the turbine. The switch can comprises a transistor. Some embodiments further comprise: a second coil surrounding at least another portion of the rotor; and a rectifier circuit coupled to the control circuit, the first coil and to the second coil; wherein the control circuit is configured to output the control signal to the rectifier circuit to cause the rectifier circuit to output a DC voltage signal to the second coil to cause the electrical braking of the turbine, wherein the DC voltage signal is rectified from the electrical power signal of the first coil. The electronic speed control system, in some embodiments, further comprises: a second coil surrounding at least another portion of the rotor; and a power storage device coupled to the control circuit and the second coil; wherein the control circuit is configured to output the control signal to the power storage device to cause the power storage device to output a power signal to the second coil to cause the electrical braking of the turbine. The power storage device can comprise a battery. Some embodiments further comprise: a converter circuit coupled to the generator and configured to convert the electrical power signal to a direct current electrical power signal; an energy harvesting circuit coupled to the converter circuit and configured to harvest energy based on the direct current electrical power signal, the energy harvesting circuit including a charging circuit; and an overspeed protection circuit coupled across the converter circuit and the charging circuit; and wherein the control circuit is coupled to the generator and the overspeed protection circuit, wherein the control signal from the control circuit is provided to the overspeed protection circuit which is configured to alter an impedance of the overspeed protection circuit to cause the electrical braking of the turbine. The overspeed protection circuit can comprise one or more transistors coupled to electrical ground and each having a respective impedance, wherein a value of the control signal to each of the one or more transistors dictates a respective impedance of each of the one or more transistors. The one or more transistors, in some implementations, comprise one or more field effect transistors. In some embodiments, when the respective impedance of the overspeed protection circuit is lowered when the flow rate of the fluid flow is too high, additional current is drawn from the generator causing an opposing torque to brake the generator and turbine causing the electrical braking of the turbine. The one or more transistors can comprise a plurality of transistors coupled in parallel to each other and each receiving a respective control signal from the control circuit. A degree of the electrical braking is controlled, in some embodiments, through the selective application of control signals to one or more of the plurality of transistors coupled in parallel to each other. The respective control signal applied to each of the plurality of transistors can comprise a pulse width modulation (PWM) signal. In some embodiments, a voltage of the respective control signal applied to each of the plurality of transistors dictates the respective impedance of each of the plurality of transistors. In some embodiments, the system can comprise a converter circuit coupled to the generator and configured to convert the electrical power signal to a direct current electrical power signal; an energy harvesting circuit coupled to the converter circuit and configured to harvest energy based on the direct current electrical power signal; and an overspeed protection circuit coupled across the converter circuit, wherein the control circuit is coupled to the generator and the overspeed protection circuit, wherein the control signal from the control circuit is provided to the overspeed protection circuit which is configured to alter an impedance of the overspeed protection circuit to cause the electrical braking of the turbine and to ensure a voltage and current be provided that is suitable to charge a power storage device such that a separate charging circuit is not needed. In some embodiments, the control circuit and the overspeed protection circuit are configured to function as a charging circuit for the power storage device.

The electronic speed control system, in some embodiments, further comprises: a converter circuit coupled to the generator and configured to convert the electrical power signal to a direct current electrical power signal; an energy harvesting circuit coupled to the converter circuit and configured to harvest energy based on the direct current electrical power signal, the energy harvesting circuit including a charging circuit; and a diode coupled to the converter circuit and the charging circuit and configured to open and shunt the direct current electrical power signal to ground when a voltage level of the direct current electrical power signal exceeds a breakdown voltage of the diode resulting in the electrical braking of the turbine. The diode, in some implementations, can comprise a Zener diode connected in reverse bias orientation and wherein the breakdown voltage is near a maximum operating voltage of the energy harvesting circuit.

Some embodiments provide methods of electronic speed control system for a hydro-power generation system of an irrigation system, comprising: activating, through a fluid flow in a conduit of an irrigation system, a turbine of a generator, wherein the generator comprises a rotor, a first coil surrounding at least a portion of the rotor, and the turbine, wherein the turbine is at least partially inserted into a fluid flow path of the conduit; outputting, using a generator, an electrical power signal in response to the activation of the turbine; determining, based on the electrical power signal, that a flow rate of the fluid flow is too high; and outputting a control signal to cause electrical braking of the turbine.

Some embodiments provide overvoltage protection systems for a hydro-power generation system of an irrigation system, the overvoltage protection system comprising: a generator comprising a turbine at least partially inserted into a fluid flow path of a conduit of the irrigation system and configured to be activated by a fluid flow in the conduit, wherein the generator is configured to output an electrical power signal in response to the activation of the turbine; a converter circuit coupled to the generator and configured to convert the electrical power signal to a direct current electrical power signal; an energy harvesting circuit coupled to the converter circuit and configured to harvest energy based on the direct current electrical power signal, the energy harvesting circuit including a charging circuit; and a diode coupled to the converter circuit and the charging circuit and configured to open and shunt the direct current electrical power signal to ground when a voltage level of the direct current electrical power signal exceeds a breakdown voltage of the diode resulting in an electronic braking of the turbine. The diode can comprise a Zener diode connected in reverse bias orientation and wherein the breakdown voltage is near a maximum operating voltage of the energy harvesting circuit.

Some embodiments provide methods of overvoltage protection for a hydro-power generation system of an irrigation system, the method comprising: activating, through a fluid flow in a conduit of an irrigation system, a turbine of a generator, wherein the turbine is at least partially inserted into a fluid flow path of the conduit; outputting, using a generator, an electrical power signal in response to the activation of the turbine; converting the electrical power signal to a direct current electrical power signal; harvesting, using an energy harvesting circuit having a charging circuit, energy based on the direct current electrical power signal; and opening and shunting, when a voltage level of the direct current electrical power signal exceeds a breakdown voltage of a diode coupled to the converter circuit and the charging circuit, the direct current electrical power signal to ground resulting in an electronic braking of the turbine.

Some embodiments provide filter debris cleaner systems for use in an irrigation conduit, comprising: a filter cleaner comprising: a first portion configured to be fixed proximate to a location in a fluid flow path of the irrigation conduit containing a filter such that fluid flow will pass through the filter and debris may collect on a filter surface of the filter; and a movable portion comprising a scrubber surface configured to physically contact a portion of the filter surface and move against the filter surface in response to a change in flow of the fluid flow such that the change in the flow causes the scrubber surface to clean the portion of the filter surface. In some implementations, the filter debris cleaner systems further comprise the filter secured proximate to the location in the fluid flow path and configured to enable the fluid flow to pass therethrough. Some embodiments comprise a housing to which the first portion of the filter cleaner is fixed. The first portion can comprise a first end of an arm that is pivotally coupled to the housing, and the movable portion can comprises a second end of arm, wherein the scrubber surface is proximate the second end of the arm. The movable portion, in some implementations, comprises a collector portion configured to at least partially extend into the fluid flow to be contacted by a fluid to induce movement of the movable portion and the scrubber surface. The collector portion, in some embodiments, comprises at least one of a scoop, paddle, and vane. An elastic member can be included in some embodiments that is secured to the movable portion and configured to bias the scrubber surface toward a first position, wherein an increase in the fluid flow is configured to cause movement of the scrubber surface away from the first position moving the scrubber surface across at least the portion of the filter surface, and the elastic member is configured to cause movement of the scrubber surface toward the first position responsive to a decrease in the fluid flow.

In some embodiments, the scrubber surface is configured to remove at least some debris from the filter surface in response to movement of the scrubber surface across the filter surface. The movement of the scrubber surface can, in some implementations, sweep across the at least the portion of the filter surface as the scrubber surface moves away from and back towards the first position. The scrubber surface can comprise an abrasive material. In some embodiments, the movable portion is configured to cause the scrubber surface to move linearly against the portion of the filter surface. In other embodiments, the movable portion is configured to cause the scrubber surface to rotate against the portion of the filter surface. The movable portion can, in some embodiments, be configured to rotate in the fluid flow and to cause the scrubber surface to impact the portion of the filter surface at each rotation of moveable portion. The filter debris cleaner system, in some embodiments, further comprises: a main conduit of the irrigation conduit that extends between a fluid input and a fluid output and that provides a main fluid flow path; and a bypass conduit of the irrigation conduit, the bypass conduit extending from a first portion of the main conduit to a second portion of the main conduit and providing a bypass fluid flow path, wherein a first portion of the fluid flow flows in the main fluid flow path and a second portion of the fluid flow passes through the filter and flows in the bypass fluid flow path. A generator can be included in some embodiments that comprises a turbine at least partially located in the bypass fluid flow path, wherein the generator is configured to output an electrical power signal in response to activation of the turbine by fluid flow in the bypass fluid flow path.

Some embodiments provide methods of cleaning filter debris in an irrigation conduit, comprising: passing fluid flow through a filter in a fluid flow path of the irrigation conduit such that debris may collect on a filter surface of the filter; and physically contacting a portion of the filter surface with a scrubber surface of a movable portion of a filter cleaner, wherein the filter cleaner comprises a first portion fixed proximate to a location in the fluid flow path of the irrigation conduit containing the filter; and moving the scrubber surface against the filter surface in response to a change in flow of the fluid flow such that the change in the flow causes the scrubber surface to clean the portion of the filter surface.

Some embodiments provide filter health monitor systems for use in an irrigation conduit, comprising: a filter monitor circuit comprising: a first pressure sensor configured to be located proximate an upstream surface of a filter located in a fluid flow path of the irrigation conduit such that fluid flow will pass through the filter and debris may collect on a filter surface, wherein the first pressure sensor is configured to output a first signal corresponding to a first pressure of the fluid flow proximate the upstream surface of the filter; a second pressure sensor configured to be located proximate a downstream surface of the filter and to output a second signal corresponding to a second pressure of the fluid flow proximate the downstream surface of the filter; and a control circuit coupled to the first pressure sensor and the second pressure sensor and configured to determine, based on the first signal and the second signal, a health of the filter. The control circuit can be configured, in some embodiments, to receive a flow rate signal corresponding to a flow rate of the fluid flow and at a time corresponding to the first signal and the second signal, and the control circuit can be configured to determine the health of the filter based on the first signal, the second signal, and the flow rate. A flow rate sensor can be included in some embodiments that couples to the control circuit and can be configured to provide the flow rate signal to the control circuit. Some embodiments further comprise the filter located in the fluid flow path of the irrigation conduit such that the fluid flow will pass through the filter. The first pressure sensor and the second pressure sensor, in some embodiments, each can comprise a respective differential pressure sensor. The control circuit can, in some embodiments, be configured to output a value corresponding to the health of the filter having been determined. In some implementations, the control circuit is configured to output an indication of the health of the filter having been determined. The filter health monitor system, in some embodiments, further comprises a transceiver coupled to the control circuit and configured to transmit to a remote device the indication of the health of the filter having been determined. The control circuit can be configured to determine, based on the health of the filter having been determined, that the filter is recommended to be replaced and output an indication that the filter should be replaced.

Some embodiments provide methods of monitoring a health of a filter in an irrigation conduit, comprising: passing fluid flow through the filter in a fluid flow path of the irrigation conduit such that debris may collect on a filter surface of the filter; and outputting, by a first pressure sensor of a filter monitor circuit, a first signal corresponding to a first pressure of the fluid flow proximate an upstream surface of the filter, wherein the first pressure sensor is located proximate the upstream surface of the filter; outputting, by a second pressure sensor of a filter monitor circuit, a second signal corresponding to a second pressure of the fluid flow proximate a downstream surface of the filter, wherein the second pressure sensor is located proximate the downstream surface of the filter; and determining, by a control circuit coupled to the first pressure sensor and the second pressure sensor, health of the filter based on the first signal and the second signal.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A hydro-power generation system for an irrigation system comprising:
    a generator comprising a turbine at least partially inserted into a fluid flow path of a conduit of the irrigation system and configured to be activated by a fluid flow in the conduit, wherein the generator is configured to output an electrical power signal in response to the activation of the turbine;
    a control circuit coupled to the generator, wherein the control circuit is configured to:
        determine a characteristic of the electrical power signal;
        determine, based on the characteristic, a load impedance selected from a plurality of load impedances; and
        output a control signal to select the load impedance; and
    a variable load circuit coupled to the control circuit and configured to:
        receive the control signal; and
        provide the load impedance based on the control signal;
    wherein an impedance of the variable load circuit is based on the characteristic to provide power generation over various flow rates of fluid in the fluid flow path of the conduit of the irrigation system wherein the variable load circuit comprises:
        a load having a nominal load impedance;
        a switch coupled to the control circuit; and
        a supplemental load comprising one or more additional loads coupled to the switch, wherein the control signal controls the switch to selectively couple and decouple at least one of the one or more additional loads to provide the load impedance selected from the plurality of load impedances.

2. The hydro-power generation system of claim 1, wherein the characteristic comprises a frequency of the electrical power signal.

3. The hydro-power generation system of claim 2, wherein the control circuit is configured to determine the frequency of the electrical power signal as a function of a timing of pulses of the electrical power signal.

4. The hydro-power generation system of claim 2, wherein the frequency of the electrical power signal corresponds to one or both of a speed of the turbine and a flow rate of the fluid flow at the turbine.

5. The hydro-power generation system of claim 1, wherein a value of at least one of the plurality of load impedances varies over time.

6. The hydro-power generation system of claim 1, wherein a value of at least one of the plurality of load impedances is substantially constant.

7. The hydro-power generation system of claim 1, wherein the one or more additional loads comprises one or more resistors coupled in series with the load.

8. The hydro-power generation system of claim 1, wherein the switch comprises a separate switch coupled to the control circuit for each of the one or more additional loads.

9. The hydro-power generation system of claim 1,
    wherein the control circuit outputs the control signal to selectively control a duty cycle of the switch switching between a closed state and an open state that controls the selective coupling and decoupling of the load to the generator to provide the load impedance selected from the plurality of load impedances.

10. The hydro-power generation system of claim 9, wherein the switch comprises a transistor.

11. The hydro-power generation system of claim 1, wherein the variable load circuit comprises:
    a rectifier circuit coupled to the generator to convert the electrical power signal to a direct current electrical power signal to be applied to a load, wherein the rectifier circuit comprises a switch coupled in series in a path of the rectifier circuit;
    wherein the control circuit outputs the control signal to selectively control a duty cycle of the switch switching between a closed state and an open state that controls the selective coupling and decoupling of current from the path of the rectifier circuit to provide the load impedance selected from the plurality of load impedances.

12. The hydro-power generation system of claim 11, the rectifier circuit comprises a diode bridge rectifier include a positive diode path and a negative diode path, wherein the switch is coupled in series with one of the positive diode path and the negative diode path.

13. The hydro-power generation system of claim 11, wherein the switch comprises a transistor.

14. The hydro-power generation system of claim 1, further comprising a rectifier circuit coupled to the generator to convert the electrical power signal to a direct current electrical power signal to be applied to a load.

15. The hydro-power generation system of claim 1, wherein the load comprises an energy harvesting circuit.

16. The hydro-power generation system of claim 1, wherein the load comprises a charging circuit for a power storage device.

17. The hydro-power generation system of claim 1, further comprising:
    a power storage device coupled with the generator and configured to receive the electrical power signal and store electrical energy based on the electrical power signal.

18. The hydro-power generation system of claim 17, further comprising:
    an irrigation device coupled to a power storage device and configured to receive operational power from the power storage device.

19. The hydro-power generation system of claim 18, wherein the irrigation device comprises one or more of: an irrigation controller, a solenoid, an actuator, and a sensor.

20. The hydro-power generation system of claim 18, further comprising:
    a wireless transceiver irrigation control device coupled to power storage device and configured to receive operational power from the power storage device.

21. A method of hydro-power generation for an irrigation system comprising:
- activating, through a fluid flow in a conduit of an irrigation system, a turbine of a generator, wherein the turbine is at least partially inserted into a fluid flow path of the conduit;
- outputting, using a generator, an electrical power signal in response to the activation of the turbine;
- determining a characteristic of the electrical power signal;
- determining, based on the characteristic, a load impedance selected from a plurality of load impedances; and
- outputting a control signal to select the load impedance; and
- providing, by a variable load circuit, the load impedance based on the control signal;
- wherein an impedance of the variable load circuit is based on the characteristic to provide power generation over various flow rates of fluid in the fluid flow path of the conduit of the irrigation system wherein the variable load circuit comprises:
- a load having a nominal load impedance;
- a switch coupled to the control circuit; and
- a supplemental load comprising one or more additional loads coupled to the switch, wherein the control signal controls the switch to selectively couple and decouple at least one of the one or more additional loads to provide the load impedance selected from the plurality of load impedances.

* * * * *